United States Patent
Berggren

(10) Patent No.: US 11,259,259 B2
(45) Date of Patent: Feb. 22, 2022

(54) TRANSMITTER, RECEIVER AND METHODS FOR TRANSMITTING/ RECEIVING SYNCHRONISATION SIGNALS

(71) Applicant: Huawei Technologies Co., Ltd., Shenzhen (CN)

(72) Inventor: Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 15/250,543

(22) Filed: Aug. 29, 2016

(65) Prior Publication Data
US 2017/0013577 A1 Jan. 12, 2017

Related U.S. Application Data

(63) Continuation of application No. PCT/EP2014/070239, filed on Sep. 23, 2014.

(51) Int. Cl.
*H04W 56/00* (2009.01)
*H04B 7/26* (2006.01)
(Continued)

(52) U.S. Cl.
CPC ........ *H04W 56/002* (2013.01); *H04B 7/2656* (2013.01); *H04W 72/1215* (2013.01);
(Continued)

(58) Field of Classification Search
None
See application file for complete search history.

(56) References Cited

U.S. PATENT DOCUMENTS

| 2004/0114551 A1 | 6/2004 | Gavillero et al. |
| 2007/0116094 A1 | 5/2007 | Parts et al. |

(Continued)

FOREIGN PATENT DOCUMENTS

| CN | 101300802 A | 11/2008 |
| CN | 103354528 A | 10/2013 |

(Continued)

OTHER PUBLICATIONS

"Remaining conditions for D2DSS transmission," 3GPP TSG RAN WG1 Meeting #79, San Francisco, USA, R1-145093, 3rd Generation Partnership Project, Valbonne, France (Nov. 17-21, 2014).
(Continued)

*Primary Examiner* — Mohammad S Adhami
(74) *Attorney, Agent, or Firm* — Leydig, Voit & Mayer, Ltd.

(57) ABSTRACT

A transmitter, a receiver and methods therein, configured to transmit a first type of synchronisation signal, in $M_1$ symbols $l_i$, $0 \le i \le (M_1-1)$ and a second type of synchronisation signal in $M_2$ symbols $k_j$, $0 \le j \le (M_2-1)$ of a subframe, wherein $M_2 \ge M_1 \ge 2$. The transmitter comprises a processor, configured to determine in which symbols $l_i$ the synchronisation signal of the first type is to be transmitted, and in addition configured to calculate in which symbols $k_j$, the synchronisation signal of the second type is to be transmitted, by placing each of the $M_2$ symbols $k_j$ at a symbol distance from an associated symbol $l_i$. The transmitter also comprises a transmitting circuit configured to transmit the synchronisation signals of the first type in the $M_1$ symbols $l_i$, and transmitting the synchronisation signals of the second type in the $M_2$ symbols $k_j$.

15 Claims, 13 Drawing Sheets

(51) Int. Cl.
  *H04W 72/12*   (2009.01)
  *H04L 27/26*   (2006.01)
  *H04W 88/06*   (2009.01)

(52) U.S. Cl.
  CPC ........ *H04B 7/2621* (2013.01); *H04L 27/2601* (2013.01); *H04W 88/06* (2013.01)

(56) References Cited

U.S. PATENT DOCUMENTS

| | | | |
|---|---|---|---|
| 2012/0307726 A1 | 12/2012 | Pi et al. | |
| 2014/0086266 A1* | 3/2014 | Strait ................... | H04W 56/00 370/503 |
| 2015/0223245 A1* | 8/2015 | Cheng ................. | H04J 11/0069 370/329 |
| 2015/0358801 A1* | 12/2015 | Seo ...................... | H04W 8/005 370/329 |
| 2016/0130621 A1 | 5/2016 | Woo et al. | |
| 2016/0205644 A1* | 7/2016 | Seo ..................... | H04L 27/2613 370/350 |
| 2016/0308637 A1* | 10/2016 | Frenne ................ | H04J 11/0069 |
| 2017/0005850 A1* | 1/2017 | Chae ................... | H04L 27/2613 |
| 2017/0055234 A1* | 2/2017 | Seo ......................... | H04J 11/00 |

FOREIGN PATENT DOCUMENTS

| | | |
|---|---|---|
| CN | 103703712 A | 4/2014 |
| EP | 2989831 A1 | 3/2016 |
| EP | 3462648 A1 | 4/2019 |
| JP | 2004533768 A | 11/2004 |
| JP | 2014520433 A | 8/2014 |
| JP | 2016519952 A | 7/2016 |
| JP | 2017503386 A | 1/2017 |
| KR | 20140035930 A | 3/2014 |
| RU | 2460226 C2 | 8/2012 |
| WO | 2008101762 A1 | 8/2008 |
| WO | 2012165904 A2 | 12/2012 |
| WO | WO 2012165904 A2 | 12/2012 |

OTHER PUBLICATIONS

"3$^{rd}$ Generation Partnership Project Technical Specification Group Radio Access Network; Evolved Universal Terrestrial Radio Access (E-UTRA); Physical channels and modulation (Release 12)," 3GPP TS 36.211, V12.2.0, pp. 1-121, 3$^{rd}$ Generation Partnership Project, Valbonne, France (Jun. 2014).
"RAN1 Chairman's Notes," 3GPP TSG RAN WG1 Meeting #78, Dresden Germany, 3$^{rd}$ Generation Partnership Project, Valbonne, France (Aug. 18-22, 2014).
"D2DSS design," 3GPP TSG RAN WG1 Meeting #77, Seoul, Korea, R1-142340, 3$^{rd}$ Generation Partnership Project, Valbonne, France (May 19-23, 2014).
"Remaining details of D2D synchronization signals," 3GPP TSG RAN WG1 Meeting #78, Dresden, Germany, R1-142843, 3$^{rd}$ Generation Partnership Project, Valbonne, France (Aug. 18-21, 2014).
"Signal Design for D2D Synchronization," 3GPP TSG-RAN WG1 #78, Dresden, Germany, R1-142964, 3$^{rd}$ Generation Partnership Project, Valbonne, France (Aug. 18-22, 2014).
Schmidl et al., "Robust Frequency and Timing Synchronization," IEEE Transactions on Communications, vol. 24, Issue 12, pp. 1613-1621, Institute of Electrical and Electronics Engineers, New York, New York (Dec. 1997).
"Discussion on synchronization signal design," 3GPP TSG RAN WG1 Meeting #78, Dresden, Germany, R1-143189, 3rd Generation Partnership Project, Valbonne, France (Aug. 18-22, 2014).
EP 14772133.6-1219, Office Action, dated Jun. 3, 2019.
Huawei, HiSilicon, "D2DSS design," 3GPP TSG RAN WG1 Meeting #77, Seoul, Korea, R1-142340, total 11 pages, 3rd Generation Partnership Project, Valbonne, France (May 2014).
Qualcomm Incorporated, "Signal Design for D2D Synchronization," 3GPP TSG-RAN WG1 #78, Dresden, Germany, R1-142964, total 10 pages, 3rd Generation Partnership Project, Valbonne, France (Aug. 2014).
Huawei, HiSilicon, "Remaining details of D2D synchronization signals," 3GPP TSG RAN WG1 Meeting #78, Dresden, Germany, R1-142843, total 19 pages, 3rd Generation Partnership Project, Valbonne, France (Aug. 2014).
CN/201910465245.4, Office Action/Search Report, dated Mar. 18, 2021.
JP/2017-239938, Office Action, dated Nov. 27, 2018.

\* cited by examiner

Second type of synchronisation signal

First type of synchronisation signal 0  1  2  3  4  5  6  7  8  9  10  11  12  13

Second type of synchronisation signal

First type of synchronisation signal

TRANSMITTER, RECEIVER AND METHODS FOR TRANSMITTING/ RECEIVING SYNCHRONISATION SIGNALS

CROSS-REFERENCE TO RELATED APPLICATIONS

This application is a continuation of International Patent Application No. PCT/EP2014/070239, filed Sep. 23, 2014, which is hereby incorporated by reference in its entirety.

TECHNICAL FIELD

Implementations described herein generally relate to a transmitter, a method in a transmitter, a receiver and a method in a receiver. In particular, a mechanism is herein described, for transmitting a first type of synchronisation signal and a second type of synchronisation signal.

BACKGROUND

In a wireless communication system, transmitters and receivers have to be synchronised in time and frequency in order to communicate. This is typically achieved by letting the transmitter transmit a synchronisation signal which the receiver can detect. For example, in a cellular mobile communications system, synchronisation signals are used for cell search, which is the procedure by which the User Equipment (UE) acquires time- and frequency synchronisation with a cell and detects its cell ID. The UE may sometimes be referred to as a mobile terminal, wireless terminal, mobile station, mobile telephone, cellular telephone, or similar.

The wireless communication system covers a geographical area which may be divided into cell areas, with each cell area being served by a radio network node or base station, e.g., a Radio Base Station (RBS) or Base Transceiver Station (BTS), which in some networks may be referred to as "eNB", "eNodeB", "NodeB" or "B node", depending on the technology and/or terminology used. However, sometimes communication may be made directly between mobile stations; directly or via other mobile stations. Such communication paradigm is sometimes referred to as Device-to-Device (D2D) communication. D2D communication may be possible both with and/or without the presence of a cellular infrastructure.

Several synchronisation signals may be defined; each serving its specific purpose. For example, one type of signal may be designed for obtaining timing synchronisation on a sample level, while another type of synchronisation signal, may provide additional information, e.g., for obtaining subframe or radio frame level synchronisation. Generally, the process of acquiring synchronisation is computationally intense, contributing to the power consumption of the receiver while also constituting a significant part of the cost of its chipset. Hence, it is understood that synchronisation signals have to be designed to provide for low-complex implementations in the receiver.

In certain applications, it may be desirable to transmit synchronisation signals in bursts. That is, several synchronisation signals may be transmitted in a short period of time, i.e., a burst while the period of the bursts may be relatively long. This allows the receiver to obtain synchronisation in a relatively short time, i.e., from receiving just one single synchronisation burst. FIG. 8A shows an example where a burst contains several Orthogonal Frequency-Division Multiplexing (OFDM), or alternatively Single Carrier-Frequency Division Multiple Access (SC-FDMA) symbols carrying synchronisation signals, while having a burst period which is long in comparison to the inter-symbol spacing of the synchronisation symbols within the burst. A direct consequence of a burst transmission is therefore that the distance between OFDM/SC-FDMA symbols containing a synchronisation signal may not be uniform. This is in contrast to a periodic transmission, wherein the synchronisation signal is transmitted with equidistantly placed OFDM/SC-FDMA symbols.

Burst transmission of synchronisation signals may be efficient, e.g., for systems that utilise fast ON/OFF switching of the cells, to adapt to the dynamically varying traffic loads. Once the cell has been switched ON, receivers may quickly synchronise to it, which makes burst transmission of the synchronisation signal from the cell desirable.

A further example is Device-to-Device (D2D) communications, where a mobile terminal is transmitting the synchronisation signal, which is to be detected by another mobile terminal in its vicinity. In order to save transmission power, it is desirable to transmit the synchronisation signal in bursts, which allows the power amplifier to be shut down between the bursts. It is also desirable to concentrate the synchronisation signals into bursts, since it minimizes the impact on the time-frequency resources available to the cellular communications, i.e., non-D2D communications.

For D2D communications within a Long Term Evolution (LTE) system, the notion of sidelink communication is used (in contrast to uplink and downlink for cellular communications). Synchronisation sources will transmit a sidelink synchronisation signals. The sidelink synchronisation signals are constrained to be transmitted within one subframe, i.e., in a burst. The sidelink synchronisation signals are generated as SC-FDMA signals. The notion of OFDM symbol and SC-FDMA symbol can be used interchangeably herein without affecting the disclosed solutions. A subframe may be 1 ms long and comprise, e.g., 12 or 14 SC-FDMA symbols depending on cyclic prefix length. Further, the sidelink synchronization signals may comprise two SC-FDMA symbols, comprising a primary sidelink synchronization signal and two SC-FDMA symbols comprising a secondary sidelink synchronization signal. Both the SC-FDMA symbols comprising the primary sidelink synchronization signal use the same modulation sequence, which is designed to accommodate efficient matched filters in the detector. The secondary sidelink synchronization signal SC-FDMA symbols may use different modulation sequences which may provide further information to the receiver, e.g., subframe timing. Generally, the sidelink synchronization signals may convey information such as, e.g., a physical layer sidelink synchronization identity, the synchronisation source type (e.g., if it is an eNodeB, a UE or a relay) and/or the number of hops between D2D UEs over which the sidelink synchronization signal has been transmitted.

It may be noted that in the prior art LTE system, a Primary Synchronisation Signal (PSS) and a Secondary Synchronisation Signal (SSS) are transmitted in an OFDM symbol every 5 ms, respectively, and there is no notion of bursts. Therefore, the distance between two consecutive PSS (or SSS) OFDM symbols is always 5 ms according to prior art.

The SC-FDMA symbol positions of the primary sidelink synchronization signal and the secondary sidelink synchronization signals may be crucial and may be carefully chosen in order to allow low-complex implementations of the synchronisation unit in the receiver. In some prior art embodiments, the primary sidelink synchronization signals may be located consecutively in SC-FDMA symbol 6 and 7 and the secondary sidelink synchronization signals in SC-FDMA symbol 1 and 12, see FIG. 8B.

However, the arrangement disclosed in FIG. 8B does not render reduced complexity in the receiver for several reasons. Once the receiver has acquired the OFDM/SC-FDMA symbol timing by detecting the primary sidelink synchronization signal, it will proceed with detecting the secondary sidelink synchronization signals in order to obtain subframe timing, i.e., in which OFDM/SC-FDMA symbol the subframe starts/stops. It may then consider the primary sidelink synchronization signal as a known reference symbol from which it may estimate the channel. It would then be possible to coherently detect the secondary sidelink synchronization signals using channel estimates from the primary sidelink synchronization signal. In a time-varying channel, it is essential that the reference symbol, i.e., primary sidelink synchronization signal is located closely to the data symbol, i.e., secondary sidelink synchronization signal, for which it should provide the channel estimate. In FIG. 8B, the smallest distance between a primary sidelink synchronization signal and a secondary sidelink synchronization signal is 5 OFDM/SC-FDMA symbols, which is not beneficial when the transmitter and/or receiver are moving around since the channel estimate may become outdated. Due to this limitation, the receiver may need to use non-coherent secondary sidelink synchronization signal detection, yielding worse performance. It may be noted that for D2D communications, both the transmitter and receiver may be moving, which is in contrast to cellular communication systems.

Furthermore, when the receiver is detecting the primary sidelink synchronization signal, it typically is using a matched filter whose output is a correlation value. Due to noise and channel fading, it may not necessarily detect two correlation peaks although there are two primary sidelink synchronization signal symbols in the subframe. Therefore, it cannot know which of the two primary sidelink synchronization signal symbols it has detected. In FIG. 8B, the distance in OFDM/SC-FDMA symbols between the secondary sidelink synchronization signal in symbol 1 and the primary sidelink synchronization signals in symbol 6 and 7 respectively are different, i.e., four and five OFDM/SC-FDMA symbols respectively. The same observation holds for the secondary sidelink synchronization signal in symbol 12. Thus when the receiver has detected a correlation peak of a primary sidelink synchronization signal, it would have to blindly detect the secondary sidelink synchronization signal, since it does not know which primary sidelink synchronization signal symbol that was detected and consequentially would not know in which OFDM/SC-FDMA symbol the secondary sidelink synchronization signal is located. Blind detection increases the complexity in the receiver and also results in worse secondary sidelink synchronization signal detection performance.

The arrangement in FIG. 8B is also not beneficial for saving transmit power in the transmitter since the primary sidelink synchronization signal and secondary sidelink synchronization signal symbols are spread out over the whole subframe. This makes it more difficult to turn off the power amplifier in order to save battery power.

Thus the location of symbols for synchronisation signals and transmission of synchronisation signals may be improved, for improving synchronisation performance between transmitter and receiver.

SUMMARY

It is therefore an object to obviate at least some of the above mentioned disadvantages and provide a first and second synchronisation signal in symbols of a subframe.

This and other objects are achieved by the features of the appended independent claims. Further implementation forms are apparent from the dependent claims, the description and the figures.

According to a first aspect, a transmitter is provided, configured to transmit a first type of synchronisation signal, in $M_1$ symbols $l_i$, $0 \leq i \leq (M_1-1)$ of a subframe and a second type of synchronisation signal in $M_2$ symbols $k_j$, $0 \leq j \leq (M_2-1)$ of the subframe. The subframe comprises N symbols, wherein $N \geq M_2 \geq M_1 \geq 2$. The transmitter comprises a processor, configured to determine in which symbols $l_i$ of the subframe the synchronisation signal of the first type is to be transmitted. The processor is further configured to calculate in which symbols $k_j$ of the subframe, the synchronisation signal of the second type is to be transmitted, by placing each of the $M_2$ symbols $k_j$ at a one or more determined symbol distance from an associated symbol $l_i$, wherein said one or more determined symbol distance between each of the $M_2$ symbols $k_j$ and the respective associated symbol $l_i$ is equal for all of the $M_1$ symbols $l_i$ in the subframe. Additionally, the transmitter also comprises a transmitting circuit, configured to transmit the synchronisation signals of the first type in the determined $M_1$ symbols $l_i$ of the subframe, and to transmit the synchronisation signals of the second type in the calculated $M_2$ symbols $k_j$ of the subframe.

An advantage thereby is that the receiver is enabled to easily detect a synchronisation signal of the second type, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver, while improving the synchronisation between transmitter and receiver. Thus efficient and yet easily implemented synchronisation of transmitter and receiver is achieved.

In a first possible implementation of the transmitter according to the first aspect, the one or more symbol distance between the determined $M_1$ symbols $l_i$ and each of the associated $M_2$ symbols $k_j$ may be determined from the first time instance after the cyclic prefix of the symbols $l_i$, $k_j$.

By setting the spacing between the first sample of the first type of synchronisation signal and the first sample of the second type of synchronisation signal constant for all symbols containing the first type of synchronisation signals, it is enabled to determine the position of the second type of synchronisation signal unambiguously even if the different types of synchronisation signals are located in OFDM/SC-FDMA symbols with different cyclic prefix length. Thus blind detection of the second type of synchronisation signal is avoided, also in case of different cyclic prefix length of symbols in the subframe.

In a second possible implementation of the transmitter according to the first aspect, or the first possible implementation of the first aspect, the processor may be further configured to calculate the one or more determined symbol distance between each of the $M_2$ symbols $k_1$ and the respective associated symbol $l_i$, based on a set of integer offset values $\Delta_j$, which is known by a receiver, and by calculating: $k_j = l_i + \Delta_j$, $\forall l_i$, where $|\Delta| > 0$, $(k_j, l_i) \in \{0, 1, \ldots, N-1\}$.

An advantage thereby is that the receiver thereby is enabled to detect a synchronisation signal of the second type, only by detecting one synchronisation signal of the first type and by knowing the above specified algorithm and the set of integer offset values $\Delta_j$. Thereby synchronisation between transmitter and receiver is improved.

In a third possible implementation of the transmitter according to the first aspect, or any of the previous implementations of the first aspect, the processor may be configured to establish the set of offset values $\Delta_j$ such that: $|\Delta|=1$, 2 and/or 3.

By locating synchronisation signals of the first and the second type, respectively, in vicinity of each other, coherent detection is enabled.

In a fourth possible implementation of the transmitter according to the first aspect, or any of the previous implementations of the first aspect, the $M_1$ symbols $l_i$ may be determined to be contiguously located in subsequent symbols $l_i$, such that: $l_{i+1}=l_i+1$.

By placing symbols holding synchronisation signals close to each other in the subframe, the transmitter amplifier may be switched off when the symbols holding these synchronisation signals have been transmitted, until it is time to transmit corresponding symbol of the subsequent subframe holding synchronisation signals. Thereby energy is saved.

In a fifth possible implementation of the transmitter according to the first aspect, or any of the previous implementations of the first aspect, the $M_1$ symbols $l_i$ may be determined to be distantly located from each other, such that: $l_{i+1} \geq l_i+N-3$.

Thereby, the transmission of synchronisation signals of the first type will be separated in time. This is an advantage in particular when transmitting during harsh radio transmitting conditions with a varying signal quality, as the risk of transmitting all synchronisation signals of the first type when the receiver is in radio shadow is reduced. Thereby a more robust synchronisation scheme is achieved.

In a sixth possible implementation of the transmitter according to the first aspect, or any of the previous implementations of the first aspect, the $M_1$ symbols $l_i$ may have an equal cyclic prefix length and/or wherein the $M_2$ symbols $k_j$ may have an equal cyclic prefix length.

Thereby blind decoding of the symbol position of a synchronisation signal of the second type is avoided, as synchronisation signals of the first type are allocated to symbols having the same cyclic prefix length and synchronisation signals of the second type are allocated to symbols having the same cyclic prefix length, which may or may not be the same as that for the synchronisation signals of the first type.

In a seventh possible implementation of the transmitter according to the first aspect, or any of the previous implementations of the first aspect, the number of symbols $l_i$, $k_j$ may be the same for the first type and the second type of synchronisation signals, such that $M_1=M_2$ and the set of integer offset values $\Delta_j$ may comprise one single offset value.

An advantage by having one single offset value $\Delta$ is that the receiver only is required to know this single offset value $\Delta$. Thereby, the synchronisation between transmitter and receiver is enhanced.

In an eighth possible implementation of the transmitter according to the first aspect, or any of the previous implementations of the first aspect, the $M_2$ number of symbols $k_j$ may exceed the $M_1$ number of symbols $l_i$ and the set of offset values $\Delta_j$ may comprise a plurality of distinct integer offset values $\Delta_j$, defining the respective determined symbol distance between each of the $M_2$ symbols $k_j$ and the respective associated symbol $l_i$, such that: $k_j=l_i+\Delta_j$, wherein $\Delta_j \in \{0,1,\ldots,N-1\}$.

By transmitting more reference signals of the second type than reference signals of the first type, synchronisation between transmitter and receiver is improved.

In a ninth possible implementation of the transmitter according to the first aspect, or any of the previous implementations of the first aspect, the first type of synchronisation signal and the second type of synchronisation signal may be dedicated for Device-to-Device (D2D) communication and the transmitter comprises a non-stationary unit.

Synchronisation between non-stationary units is typically more crucial than between one stationary unit and one non-stationary unit, as both the non-stationary transmitter and receiver may drift in relation to a stationary network node and thereby also drift in relation to each other. Thanks to the provided transmitter, a robust and reliable, yet fast synchronisation protocol is achieved.

In a tenth possible implementation of the transmitter according to the first aspect, or any of the previous implementations of the first aspect, the transmitter may comprise a user equipment (UE) operating within a $3^{rd}$ Generation Partnership Project Long Term Evolution (3GPP LTE) system, and wherein the synchronisation signals of the first type may comprise a primary sidelink synchronization signal and wherein the synchronisation signals of the second type may comprise secondary sidelink synchronization signal.

Thus a transmitter is provided, enabled for synchronisation in a 3GPP LTE environment.

In an eleventh possible implementation of the transmitter according to the first aspect, or any of the previous implementations of the first aspect, the first type of synchronisation signal, and/or the second type of synchronisation signal may be based on any of Orthogonal Frequency-Division Multiplexing (OFDM) or Single Carrier-Frequency Division Multiple Access (SC-FDMA).

Thus a transmitter is provided, enabled for synchronisation in a 3GPP LTE environment, in both directions between transmitter and receiver.

According to a second aspect, a method in a transmitter is provided, for transmitting a first type of synchronisation signal in $M_1$ symbols $l_i$, $0 \leq i \leq (M_1-1)$ of a subframe and a second type of synchronisation signal, comprising $M_2$ symbols $k_j$, $0 \leq j \leq (M_2-1)$ in the subframe, which subframe comprises N symbols, wherein $N \geq M_2 \geq M_1 \geq 2$. The method comprises determining in which $M_1$ symbols $l_i$ of the subframe, the synchronisation signal of the first type is to be transmitted. Further, the method also comprises calculating in which $M_2$ symbols $k_j$ of the subframe, the synchronisation signal of the second type is to be transmitted by placing the $M_2$ symbols $k_j$ at a one or more determined symbol distance from an associated symbol $l_i$, wherein said one or more determined symbol distance between each of the $M_2$ symbols $k_j$ and the respective associated symbol $l_i$ is equal between all of the $M_1$ symbols $l_i$ in the subframe and their respective associated $M_2$ symbols $k_j$. In addition, the method also comprises transmitting the synchronisation signal of the first type in the determined $M_1$ symbols $l_i$ of the subframe, and the synchronisation signal of the second type in the calculated $M_2$ symbols $k_j$ of the subframe.

An advantage thereby is that the receiver is enabled to easily detect a synchronisation signal of the second type, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

In a first possible implementation of the method according to the second aspect, the one or more symbol distance between the determined $M_1$ symbols $l_i$ and each of the associated $M_2$ symbols $k_j$ may be determined from the first time instance after the cyclic prefix of the symbols $l_i$, $k_j$.

By setting the spacing between the first sample of the first type of synchronisation signal and the first sample of the second type of synchronisation signal constant for all symbols containing the first type of synchronisation signals, it is enabled to determine the position of the second type of synchronisation signal unambiguously even if the different types of synchronisation signals are located in OFDM/SC-FDMA symbols with different cyclic prefix length. Thus blind detection of the second type of synchronisation signal is avoided, also in case of different cyclic prefix length of symbols in the subframe.

In a second possible implementation of the method according to the second aspect, or the first possible implementation of the second aspect, the one or more determined symbol distance between each of the $M_2$ symbols $k_j$ and the respective associated symbol $l_i$ may be calculated, based on a set of integer offset values $\Delta_j$, which may be known by a receiver, and by calculating: $k_j=l_i+\Delta_j$, $\forall l_i$, where $|\Delta_j|>0$, $(k_j, l_i) \in \{0,1, \ldots, N-1\}$.

An advantage thereby is that the receiver thereby is enabled to detect a synchronisation signal of the second type, only by detecting one synchronisation signal of the first type and by knowing the above specified algorithm and the set of integer offset values $\Delta_j$. Thereby synchronisation between transmitter and receiver is improved.

In a third possible implementation of the method according to the second aspect, or any of the previous implementations of the second aspect, the method may comprise establishing the set of offset values $\Delta_j$ such that: $|\Delta|=1, 2$ and/or 3.

By locating synchronisation signals of the first and the second type, respectively, in vicinity of each other, coherent detection is enabled.

In a fourth possible implementation of the method according to the second aspect, or any of the previous implementations of the second aspect, the $M_1$ symbols $l_i$ may be determined to be contiguously located in subsequent symbols $l_i$, such that: $l_{i+1}=l_i+1$.

By placing symbols holding synchronisation signals close to each other in the subframe, the transmitter amplifier may be switched off when the symbols holding these synchronisation signals have been transmitted, until it is time to transmit corresponding symbol of the subsequent subframe holding synchronisation signals. Thereby energy is saved.

In a fifth possible implementation of the method according to the second aspect, or any of the previous implementations of the second aspect, the $M_1$ symbols $l_i$ may be determined to be distantly located from each other, such that: $l_{i+1} \geq l_i+N-3$.

Thereby, the transmission of synchronisation signals of the first type will be separated in time. This is an advantage in particular when transmitting during harsh radio transmitting conditions with a varying signal quality, as the risk of transmitting all synchronisation signals of the first type when the receiver is in radio shadow is reduced. Thereby a more robust synchronisation scheme is achieved.

In a sixth possible implementation of the method according to the second aspect, or any of the previous implementations of the second aspect, the $M_1$ symbols $l_i$ may have an equal cyclic prefix length and/or wherein the $M_2$ symbols $k_j$ may have an equal cyclic prefix length.

Thereby blind decoding of the symbol position of a synchronisation signal of the second type is avoided, as synchronisation signals of the first type are allocated to symbols having the same cyclic prefix length and synchronisation signals of the second type are allocated to symbols having the same cyclic prefix length, which may or may not be the same as that for the synchronisation signals of the first type.

In a seventh possible implementation of the method according to the second aspect, or any of the previous implementations of the second aspect, the number of symbols $l_i$, $k_j$ may be the same for the first type and the second type of synchronisation signals, such that $M_1=M_2$ and the set of integer offset values $\Delta_j$ may comprise one single offset value.

An advantage by having one single offset value $\Delta_j$ is that the receiver only is required to know this single offset value $\Delta$. Thereby, the synchronisation between transmitter and receiver is enhanced.

In an eighth possible implementation of the method according to the second aspect, or any of the previous implementations of the second aspect, the $M_2$ number of symbols $k_j$ may exceed the $M_1$ number of symbols $l_i$ and the set of offset values $\Delta_j$ may comprise a plurality of distinct integer offset values $\Delta_j$, defining the respective determined symbol distance between each of the $M_2$ symbols $k_j$ and the respective associated symbol $l_i$, such that: $k_j=l_i+\Delta_j$, wherein $\Delta_j \in \{0,1, \ldots, N-1\}$.

By transmitting more reference signals of the second type than reference signals of the first type, synchronisation between transmitter and receiver is improved.

In a ninth possible implementation of the method according to the second aspect, or any of the previous implementations of the second aspect, the first type of synchronisation signal and the second type of synchronisation signal may be dedicated for Device-to-Device (D2D) communication and the transmitter comprises a non-stationary unit.

Synchronisation between non-stationary units is typically more crucial than between one stationary unit and one non-stationary unit, as both the non-stationary transmitter and receiver may drift in relation to a stationary network node and thereby also drift in relation to each other. Thanks to the provided method, a robust and reliable, yet fast synchronisation protocol is achieved.

In a tenth possible implementation of the method according to the second aspect, or any of the previous implementations of the second aspect, the transmitter may comprise a user equipment (UE) operating within a 3rd Generation Partnership Project Long Term Evolution (3GPP LTE) system, and wherein the synchronisation signals of the first type may comprise primary sidelink synchronization signals and wherein the synchronisation signals of the second type may comprise secondary sidelink synchronization signals.

Thus a method is provided, enabled for synchronisation in a 3GPP LTE environment.

In an eleventh possible implementation of the method according to the second aspect, or any of the previous implementations of the second aspect, the first type of synchronisation signal, and/or the second type of synchronisation signal may be based on any of Orthogonal Frequency-Division Multiplexing (OFDM) or Single Carrier-Frequency Division Multiple Access (SC-FDMA).

Thus a method is provided, enabled for synchronisation in a 3GPP LTE environment, in both directions between transmitter and receiver.

According to a third aspect, a receiver is provided, configured to detect a received first type of synchronisation signal, in $M_1$ symbols $l_i$, $0 \leq i \leq (M_1-1)$ of a subframe and a second type of synchronisation signal, in $M_2$ symbols $k_j$, $0 \leq j \leq (M_2\_1)$. The synchronisation signals are received in a subframe comprising N symbols, wherein $N > M_2 \geq M_1 \geq 2$. The receiver comprises a receiving circuit configured to receive the synchronisation signal of the first type in the $M_1$ symbols $l_i$ of the subframe. Further, the receiver also comprises a processor, configured to establish a one or more determined symbol distance between a symbol $k_j$ and an associated symbol $l_i$. In addition the receiving circuit is additionally configured to calculate in which $M_2$ symbols $k_j$ of the subframe, the synchronisation signal of the second type is to be detected, wherein said one or more determined symbol distance between each of the $M_2$ symbols $k_j$ and the respective associated symbol $l_i$ is equal for all of the $M_1$ symbols $l_i$ in the subframe.

An advantage thereby is that the receiver is enabled to easily detect a synchronisation signal of the second type, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

In a first possible implementation of the receiver according to the third aspect, the processor may be configured for calculating the one or more determined symbol distance between each of the $M_2$ symbols $k_j$ and the respective associated symbol $l_i$, based on a set of offset values $\Delta_j$, and by calculating: $k_j = l_i + \Delta_j$, $\forall l_i$, where $|\Delta| > 0$, $(k_j, l_i) \in \{0,1, \ldots, N-1\}$.

An advantage thereby is that the receiver is enabled to detect a synchronisation signal of the second type, only by detecting one synchronisation signal of the first type and by knowing the above specified algorithm and the set of integer offset values $\Delta_j$. Thereby synchronisation between transmitter and receiver is improved.

According to a fourth aspect, a method in a receiver is provided, configured to detect a first type of synchronisation signal, in $M_1$ symbols $l_i$, $0 \leq i \leq (M_1-1)$ of a subframe and a second type of synchronisation signal, in $M_2$ symbols $k_j$, received in the subframe, which subframe comprises N symbols, wherein $N \geq M_2 \geq M_1 \geq 2$. The method comprises determining in which $M_1$ symbols $l_i$ of the subframe, the synchronisation signal of the first type is received. Further the method comprises establishing a one or more determined symbol distance between each of the $M_2$ symbols $k_j$ and the respective associated symbol $l_i$ which is equal for all of the $M_1$ symbols $l_i$ in the subframe. In addition the method comprises calculating in which $M_2$ symbols $k_j$ of the subframe, the synchronisation signal of the second type is to be received. Further the method comprises detecting the $M_2$ synchronisation signal of the second type in the calculated $M_2$ symbols $k_j$ of the subframe.

An advantage thereby is that the receiver is enabled to easily detect a synchronisation signal of the second type, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

According to a another aspect, a computer program in a transmitter according to the first aspect or any possible implementation thereof, is provided, comprising program code for performing a method according to the second aspect, or any possible implementation thereof, when the computer program runs on a computer.

An advantage thereby is that easy detection of a synchronisation signal of the second type is enabled, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

According to a another aspect, a computer program in a receiver according to the third aspect, or any possible implementation thereof, is provided, comprising program code for performing a method according to the fourth aspect, or any possible implementation thereof, when the computer program runs on a computer.

An advantage thereby is that easy detection of a synchronisation signal of the second type is enabled, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

According to yet another aspect, a system is provided for synchronising a transmitter and a receiver with each other. The system comprises a transmitter according to the first aspect and a receiver according to the third aspect which are synchronised with each other by transmitting a first type of synchronisation signal in $M_1$ symbols $l_i$, $0 \leq i \leq (M_1-1)$ of a subframe and a second type of synchronisation signal, comprising $M_2$ symbols $k_j$, $0 \leq j \leq (M2-1)$ in the subframe, which subframe comprises IV symbols, wherein $N \geq M2 \geq M1 \geq 2$. The synchronisation further comprises determining in which $M_1$ symbols $l_i$ of the subframe, the synchronisation signal of the first type is to be transmitted. Further, the synchronisation also comprises calculating in which $M_2$ symbols $k_j$ of the subframe, the synchronisation signal of the second type is to be transmitted by placing the $M_2$ symbols $k_j$ at a one or more determined symbol distance from an associated symbol $l_i$, wherein said one or more determined symbol distance between each of the $M_2$ symbols $k_j$ and the respective associated symbol $l_i$ is equal between all of the $M_1$ symbols $l_i$ in the subframe and their respective associated $M_2$ symbols $k_j$. In further addition, the synchronisation also comprises transmitting the synchronisation signal of the first type in the determined $M_1$ symbols $l_i$ of the subframe, and the synchronisation signal of the second type in the calculated $M_2$ symbols $k_j$ of the subframe.

An advantage thereby is that easy detection of a synchronisation signal of the second type is enabled, without having to perform blind detection. Thanks to the fixed distance between each symbol holding a synchronisation signal of the first type and each symbol holding a synchronisation signal of the second type, the receiver does not need to know which symbol of the plurality of symbols holding the synchronisation signal of the first type that has been detected in order to detect the synchronisation signal of the second type. Thereby time, energy and computational power are saved by the receiver. Thus efficient and yet easily implemented synchronisation of transmitter and receiver is achieved.

Other objects, advantages and novel features of the described aspects will become apparent from the following detailed description.

BRIEF DESCRIPTION OF THE DRAWINGS

Various embodiments are described in more detail with reference to attached drawings, illustrating various examples, in which.

DETAILED DESCRIPTION

Embodiments of the disclosure described herein are defined as a transmitter, a method in a transmitter, a receiver and a method in a receiver, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
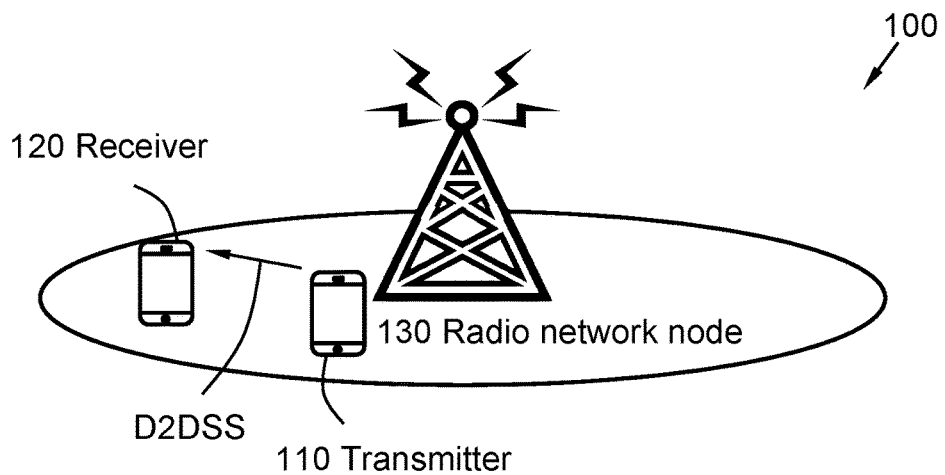
FIG. 1A is a block diagram illustrating a wireless communication network in an embodiment.

FIG. 1A is a schematic illustration over a wireless communication network 100 comprising a transmitter 110, a receiver 120 and a radio network node 130. The transmitter 110 and/or the receiver 120 may be mobile terminals, which may be served by the radio network node 130, thereby being connected to the wireless communication network 100.

The transmitter 110 and the receiver 120 may be configured for D2D communication, and the transmitter 110 may send a D2D synchronisation signal to the receiver 120, for synchronisation between the devices 110, 120.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1× RTT and High Rate Packet Data (HRPD), just to mention some few options. The expressions "wireless communication network", "wireless communication system" and/or "cellular telecommunication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

The purpose of the illustration in FIG. 1A is to provide a simplified, general overview of an example of the wireless communication network 100 and the involved methods and nodes, such as the transmitter 110, the receiver 120 and the radio network node 130 herein described, and the functionalities involved.

Figure 1B:
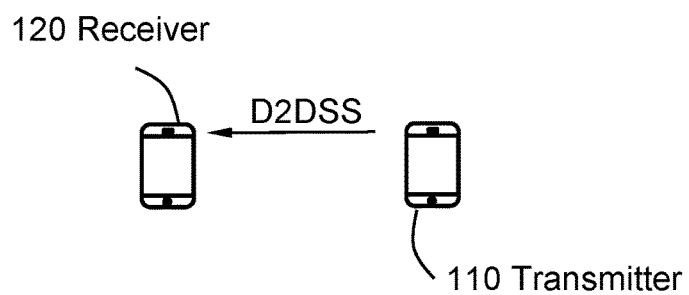
FIG. 1B is a block diagram illustrating an example of D2D communication.

FIG. 1B illustrates an example wherein the transmitter 110 and the receiver 120 are situated outside any wireless communication network 100, i.e., LTE network. The transmitter 110 transmits a D2D synchronisation signal (D2DSS) to be received by the receiver 120, for synchronisation purposes.

Figure 1C:
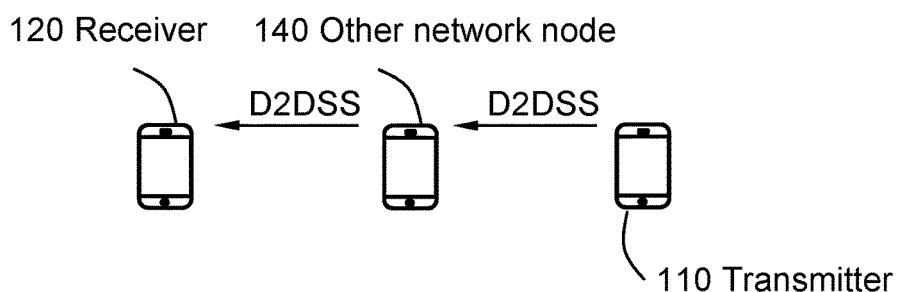
FIG. 1C is a block diagram illustrating an example of D2D communication over an intermittent node.

FIG. 1C illustrates yet an embodiment of D2D communication, wherein multi-hop is illustrated. The transmitter 110 transmits a D2DSS to be received by the receiver 120, via an intermediately situated other network node 140.

It is to be noted that the illustrated settings of FIG. 1A, FIG. 1B and/or FIG. 1C of one instance of the transmitter 110, one instance of the receiver 120 and possibly one radio network node 130 or other network node 140 in FIG. 1A, FIG. 1B and/or FIG. 1C are to be regarded as non-limiting examples of embodiments only. The wireless communication network 100 may comprise any other number and/or combination of the discussed entities 110, 120, 130, 140. A plurality of transmitters 110, receivers 120, other network nodes 140 and another configuration of radio network nodes 130 may thus be involved in some of the herein disclosed embodiments. Thus, e.g., when reference is made herein to multi-hop over another network node 140, the other network node 140 may comprise a set of a plurality of other network nodes 140, according to some embodiments.

Thus whenever "one" or "a/an" transmitter 110, receiver 120 other network node 140 and/or radio network node 130 is referred to in the present context, a plurality of the transmitter 110, receiver 120 other network node 140 and/or radio network node 130 may be involved, according to some embodiments.

The transmitter 110, the receiver 120 and/or the other network node 140 may correspondingly be represented by, e.g., a wireless communication terminal, a mobile cellular phone, a Personal Digital Assistant (PDA), a wireless platform, a mobile station a user equipment, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with each other by direct communication and possibly also with the radio network node 130, according to different embodiments and different vocabulary.

Further, the radio network node 130 and/or the other network node 140, according to some embodiments, may be configured for downlink transmission and uplink reception, and may be referred to, respectively, as, e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the mobile stations within cell coverage over a wireless interface, depending, e.g., of the radio access technology and/or terminology used.

Some embodiments may define a modular implementation approach, and make it possible to reuse legacy systems such as, e.g., standards, algorithms, implementations, components and products.

The transmitter 110 and the receiver 120 may synchronise by utilising two distinct types of synchronisation signals, transmitted in symbols in bursts, with a pre-defined inter-symbol spacing between the symbols for the two types of synchronisation signals within a burst.

The herein discussed symbols may comprise, e.g., Orthogonal Frequency-Division Multiplexing (OFDM) or Single Carrier-Frequency Division Multiple Access (SC-FDMA) symbols in different embodiments.

The transmitter 110 may transmit two types of synchronisation signals, transmitted in symbols, such as, e.g., OFDM or SC-FDMA symbols, in bursts, with a pre-defined inter-symbol spacing between the symbols for the two types of synchronisation signals within a burst.

The receiver 120 may correspondingly detect two types of synchronisation signals, transmitted in symbols, such as, e.g., OFDM or SC-FDMA symbols, in bursts, with a pre-defined inter-symbol spacing between the symbols for the two types of synchronisation signals within a burst.

The receiver 120 may optionally utilise a repetitive signal property of the synchronisation signal of the first type, if consecutive symbols are utilised for transmitting the synchronisation signal of the first type.

Thus it is herein disclosed how to arrange the symbol locations of a synchronisation signal, which is transmitted in a burst manner, in order to reduce the complexity of the receiver 120 by enabling efficient coherent detection and avoidance of blind detection.

According to an embodiment, transmission of synchronisation signals in bursts is disclosed, which may comprise of a set of N symbols labelled from $l=0, \ldots, N-1$. Several bursts may be transmitted contiguously after each other but at some point in time, there may be at least N symbols not comprising any synchronisation signals. A burst may be a subframe. It is noted that a burst may be confined to a subset of the symbols within a subframe, e.g., excluding the last symbol, which is not used for transmission for D2D communication in LTE.

It may further be assumed that two types of synchronisation signals are defined; a first type of synchronisation signal and a second type of synchronisation signal.

These synchronisation signals may comprise different information and it may be assumed that both have to be successfully detected in order to acquire sufficient synchronisation. Furthermore, the first type of synchronisation signal typically has to be detected before detecting the second type of synchronisation signal.

As a non-limiting example, the first type of synchronisation signal may be generated from one or several length-63 Zadoff-Chu sequences, whose central element is punctured, resulting in a sequence of length-62. Similarly, the second type of synchronisation signal may be generated from two interleaved length-31 sequences being derived from a set of m-sequences, resulting in a sequence of length-62.

Following the assumptions on burst transmission, there will thus be at least 2 symbols comprising consecutive transmission of the first type of synchronisation signal, having an inter-symbol spacing being different than that of another 2 symbols comprising consecutive transmission of the first type of synchronisation signal. Similarly, there will thus exist at least 2 symbols comprising consecutive transmission of the second type of synchronisation signal, having an inter-symbol spacing being different than that of another 2 symbols comprising consecutive transmission of the second type of synchronisation signal.

Suppose there are $M_1 \geq 2$ symbols that are used for the first type of synchronisation signal. These signals are transmitted in symbols $l_0, \ldots, l_{M_1-1}$. Furthermore, there are $M_2 \geq M_1$ symbols that are used for the second type of synchronisation signal. These signals are transmitted in symbols $k_0, \ldots, k_{M_2-1}$. Only 1 synchronisation signal is transmitted in 1 symbol, i.e., the intersection of these sets is empty, such that:
$\{l_0, \ldots, l_{M_1-1}\} \cap \{k_0, \ldots, k_{M_2-1}\} = \emptyset$ In one embodiment, the number of symbols may be the same for the first type and the second type of synchronisation signals, such that: $M_1 = M_2$.

In order to avoid blind detection of the second type of synchronisation signal, these signals may be transmitted in symbols $k_i$, such that: $k_i = l_i + \Delta$, $\forall l_i$, where $|\Delta| > 0$.

This implies that, in whatever symbol $l_i$ the receiver 120 detected a synchronisation signal of the first type, it may be able to detect a synchronisation signal of the second type at the unambiguous symbol position $k_i = l_i + \Delta$. The value may be either predefined, or signalled, e.g., by Radio Resource Control (RRC) signalling to the receiver 120 prior to detecting the synchronisation signal. Hence, blind symbol position detection may be avoided.

Hence, for each symbol $l_i$, the symbol distance $|k_i - l_i|$ between symbol $l_i$ and the associated symbol $k_i$ is equal for all symbols $l_i$.

When $M_2 = p \cdot M_1$, as may be the case according to some embodiments, where p>1 is an integer, it may be generalised to associate multiple symbols for the second type of synchronisation signal with one symbol for the first type of synchronisation signal. For example, for a 2-to-1 relation, it may be established in several predefined ways, e.g., if $k_0 = l_0 + \Delta$, then $k_1 = l_0 + \Delta_1$, or $k_1 = k_0 + \tilde{\Delta}$, where $\Delta_1$ and $\tilde{\Delta}$ are predefined offset parameters, similar to $\Delta$. A plurality of similar relations may be determined in embodiments when more than two symbols for the second type of synchronisation signal are associated with one symbol for the first type of synchronisation signal.

Thus when $M_1$ is 2, $M_2$ may be 4 when p is set to 2; when $M_1$ is 2, $M_2$ may be 6 when p is set to 3; and/or when $M_1$ is 3, $M_2$ may be 6 when p is set to 2. These are merely some arbitrary examples of some possible implementations.

In some embodiments, the first type of synchronisation signal may be transmitted in $M_1$ symbols $l_i$, $0 \leq i \leq (M_1-1)$ of a subframe and the second type of synchronisation signal may be transmitted in $M_2$ symbols $k_j$, $0 \leq j \leq (M_2-1)$ of the subframe.

The subframe comprises N symbols, wherein $N \geq M_2 \geq M_1 \geq 2$.

Hence, for each symbol $l_i$, the symbol distance $|k_j - l_i|$ between symbol $l_i$ and the associated symbol $k_j$ is equal for all symbols $l_i$. However, said symbol distance $|k_j - l_i|$ is different from another symbol distance $|k_{j+1} - l_i|$. Thus there may be several symbol distances for all symbols $l_i$, which however are the same for all symbols $l_i$.

In some embodiments, $M_2 > M_1$ and $M_2 \neq p \cdot M_1$, where p is an integer. In such embodiments, the symbol positions for $\lfloor M_2/M_1 \rfloor \cdot M_1$ of the symbols defined for the second type of synchronisation signals are determined according to previous embodiments. Consequently only the remaining $M_2 - \lfloor M_2/M_1 \rfloor \cdot M_1$ symbols for the second type of synchronisation signals may have additional inter-symbol spacing.

In some further embodiments, the first and second type of synchronisation signals may be located readily close in order to accommodate coherent detection. This is achieved by arranging the synchronisation signals such that $|\Delta| \ll N-1$ and to avoid maximum separation of the symbols for the two types of synchronisation signals. In one embodiment, $|\Delta| = 1, 2$ or 3 which may be expected to offer sufficient channel estimation performance in a system 100 using LTE numerology, given that the maximum Primary Synchronisation Signal (PSS) and Secondary Synchronisation Signal (SSS) spacing is three symbols.

A further embodiment comprises using contiguously located symbols for the first type of synchronisation signal, i.e., $l_{i+1} = l_i + 1$. This may easily be combined with any of the aforementioned embodiments. It may also be clear that this imposes certain constraints, e.g., $|\Delta| \geq M_1$. An advantage of using contiguously located symbols for the first type of synchronisation signal is that it may accommodate better synchronisation performance. For example, when the channel is not varying significantly between 2 symbols, it may be possible to improve the channel estimates by interpolating over the set of contiguously located symbols containing the first type of synchronisation signal.

Moreover, it has been shown that if a synchronisation signal within a symbol has a repetitive structure, it may be detected by computing a differential correlation value obtained as an auto-correlation of the received signal. One desirable property of this is that the magnitude of the correlation value is not affected by any frequency offsets. This is desirable for D2D communications, especially when operating out-of-network-coverage as illustrated in FIG. 1B and/or FIG. 1C, where the total frequency offset is due to both the transmitter 110 and the receiver 120. This may result in much larger frequency offsets than for typical cellular communications, since the radio network node 130, or eNodeB, may have much more accurate frequency oscillators than the mobile transmitter 110 and receiver 120. Further, a repetitive signal from 2 contiguous symbols also may allow computing differential correlation values for repetitive samples from different symbols. Contiguously located symbols may therefore offer more robust detection under large frequency offsets.

Further, when $\Delta>0$, it may be possible to finalise (i.e., detecting the second type of synchronisation signal) the synchronisation A symbols after the first type of synchronisation signal has been detected, by detecting the second type of synchronisation signal in that symbol.

When $\Delta<0$ and the receiver 120 buffers samples from previous symbols, it may be possible to finalise the synchronisation (i.e., detecting the second type of synchronisation signal) right after the first type of synchronisation signal has been detected.

With channel fading, it is desirable to perform repetitive transmissions of a signal with a time-separation being larger than the channel coherence time. This provides time-diversity. It may therefore be beneficial to place the symbols as far a part as possible for any of the two synchronisation signal types. A further embodiment may comprise using symbols $l_{i+1} \geq l_i + N - 3$, which results in a maximum time-separation of the synchronisation signal of the first type, in a subframe where the last symbol may not be used for transmission. Time-diversity gains could also be obtained for the second type of synchronisation signal, e.g., if $|\Delta|=1$, also $k_{i+1} \geq k_i + N - 3$.

In the following figures, several examples of different embodiments are illustrated. The transmitter 110, receiver 120 and methods therein are however neither limited to these examples, nor to the considered set of indices $l_0$ and $l_1$. Also, according to some embodiments, the second type of synchronisation signal may be detected without requirement of blind detection, which saves computing resources at the receiver 120.

Figure 2A:
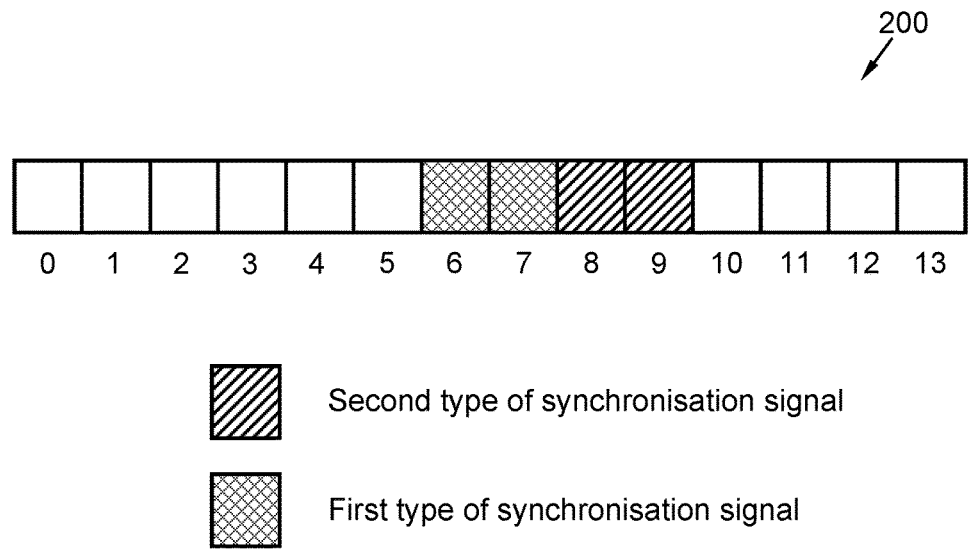
FIG. 2A is a block diagram illustrating a subframe comprising 14 symbols with positions dedicated to a first type of synchronisation signal and a second type of synchronisation signal, respectively, according to an embodiment.

FIG. 2A shows an embodiment of a subframe 200, comprising 14 symbols labelled from 0 to 13. In the illustrated example, there are two symbols (positions 6 and 7) comprising a synchronisation signal of the first type, and two symbols (positions 8 and 9) comprising a synchronisation signal of the second type. Thus $M_1=M_2=2$, $\Delta=2$ and $l_1=l_0+1$.

An advantage of the illustrated embodiment is that it may allow interpolation of channel estimates from the 2 contiguously located symbols (positions 6 and 7) comprising the first type of synchronisation signal.

However, the subframe 200 may comprise any arbitrary number N of symbols, such as, e.g., 10, 11, 12, 13, 15, 16, . . . , ∞, etc. The herein described embodiments of synchronisation are neither limited to, nor dependent upon the number of symbols within the subframe 200.

Figure 2B:
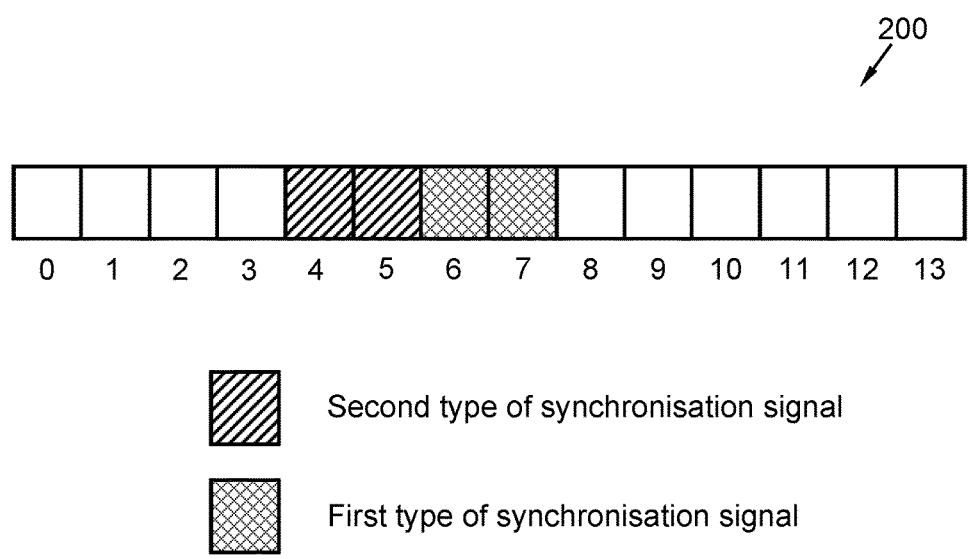
FIG. 2B is a block diagram illustrating a subframe comprising 14 symbols with positions dedicated to a first type of synchronisation signal and a second type of synchronisation signal, respectively, according to an embodiment.

FIG. 2B illustrates another embodiment of the subframe 200, comprising 14 symbols labelled from 0 to 13. In the illustrated example, there are two symbols (positions 6 and 7) comprising a synchronisation signal of the first type, and two symbols (positions 4 and 5) comprising a synchronisation signal of the second type. Thus $M_1=M_2=2$, $\Delta=-2$ and $l_1=l_0+1$.

An advantage also of the illustrated embodiment in FIG. 2B is that it may allow interpolation of channel estimates from the 2 contiguously located symbols (positions 6 and 7) comprising the first type of synchronisation signal.

Figure 2C:
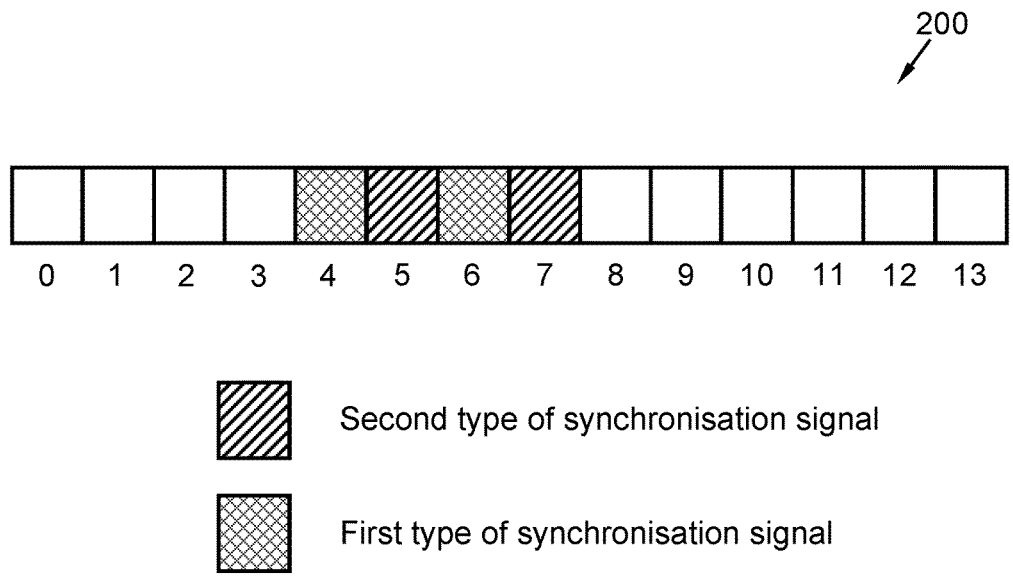
FIG. 2C is a block diagram illustrating a subframe comprising 14 symbols with positions dedicated to a first type of synchronisation signal and a second type of synchronisation signal, respectively, according to an embodiment.

FIG. 2C illustrates another embodiment of the subframe 200, comprising 14 symbols labelled from 0 to 13. In the illustrated example, there are two symbols (positions 4 and 6) comprising a synchronisation signal of the first type, and two symbols (positions 5 and 7) comprising a synchronisation signal of the second type. Thus $M_1=M_2=2$, $\Delta=1$ and $l_1=l_0+2$.

An advantage of the arrangements in FIG. 2C is that it offers the minimum separation between the symbols, i.e., 1 symbol distance spacing for the different types of synchronisation signals. Furthermore, there is 1 symbol comprising the synchronisation signal of the first type, which is located next to 2 symbols comprising the synchronisation signal of the second type, thus it may be used for channel estimation for both these 2 symbols.

Figure 2D:
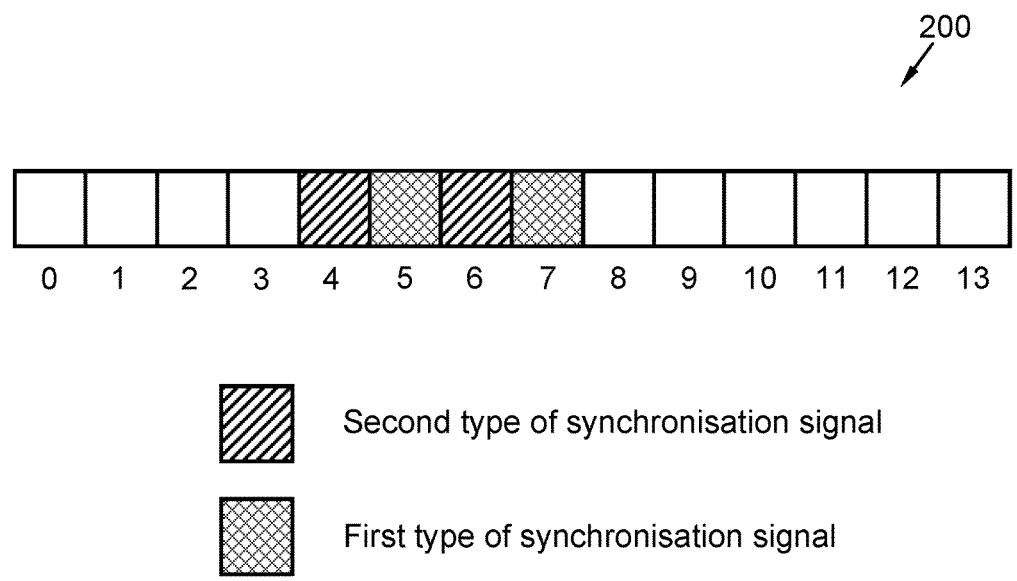
FIG. 2D is a block diagram illustrating a subframe comprising 14 symbols with positions dedicated to a first type of synchronisation signal and a second type of synchronisation signal, respectively, according to an embodiment.

FIG. 2D illustrates another embodiment of the subframe 200, comprising 14 symbols labelled from 0 to 13. In the illustrated example, there are two symbols (positions 5 and 7) comprising a synchronisation signal of the first type, and two symbols (positions 4 and 6) comprising a synchronisation signal of the second type. Thus $M_1=M_2=2$, $\Delta=-1$ and $l_1=l_0+2$.

An advantage of the arrangements in FIG. 2D is that it offers the minimum separation between the symbols, i.e., 1 symbol distance spacing for the different types of synchronisation signals. Furthermore, there is 1 symbol comprising the synchronisation signal of the first type, which is located next to 2 symbols comprising the synchronisation signal of the second type, thus it may be used for channel estimation for both these 2 symbols.

Figure 2E:
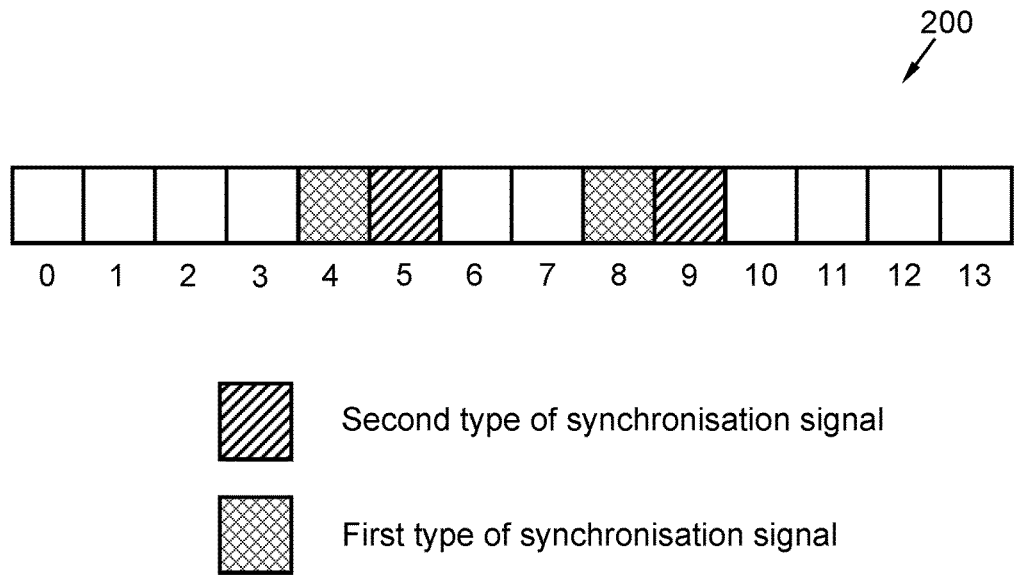
FIG. 2E is a block diagram illustrating a subframe comprising 14 symbols with positions dedicated to a first type of synchronisation signal and a second type of synchronisation signal, respectively, according to an embodiment.

FIG. 2E illustrates yet another embodiment of the subframe 200, comprising 14 symbols labelled from 0 to 13. In the illustrated example, there are two symbols (positions 4 and 8) comprising a synchronisation signal of the first type, and two symbols (positions 5 and 9) comprising a synchronisation signal of the second type. $M_1=M_2=2$, $\Delta=1$ and $l_1=l_0+4$.

Figure 2F:
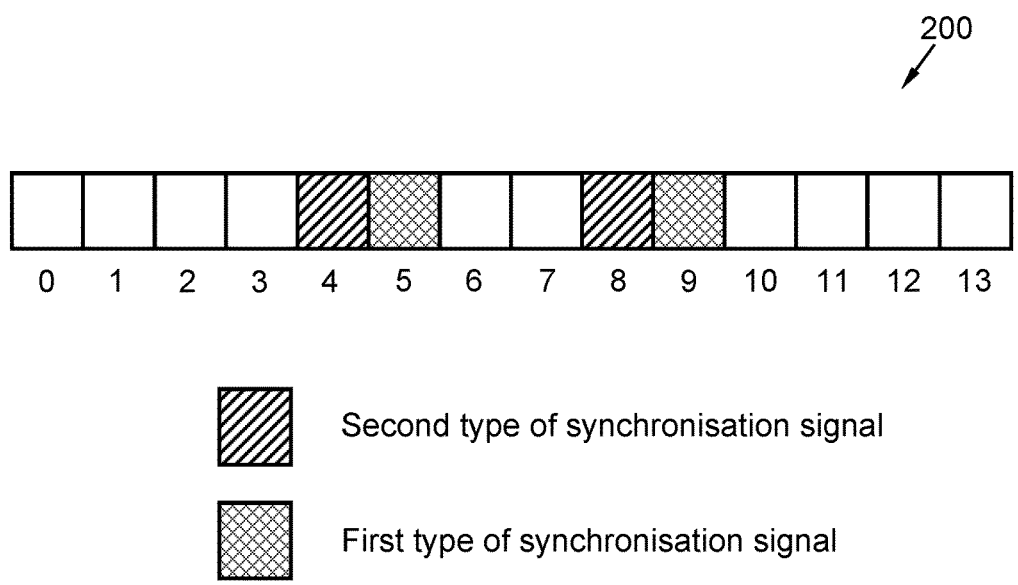
FIG. 2F is a block diagram illustrating a subframe comprising 14 symbols with positions dedicated to a first type of synchronisation signal and a second type of synchronisation signal, respectively, according to an embodiment.

FIG. 2F illustrates yet another embodiment of the subframe 200, comprising 14 symbols labelled from 0 to 13. In the illustrated example, there are two symbols (positions 5 and 9) comprising a synchronisation signal of the first type, and two symbols (positions 4 and 8) comprising a synchronisation signal of the second type. Thus $M_1=M_2=2$, $\Delta=-1$ and $l_1=l_0+4$.

An advantage of the embodiments illustrated in FIGS. 2E and 2F is that it does not require a set of contiguous symbols. Thereby these embodiments may make it easier to insert the symbols for synchronisation considering that some of the symbols of the subframe 200 may not be available and/or may be occupied for transmission of other channels and/or signals.

Furthermore, it also clear that by separating the two pairs of symbols comprising a synchronisation signal of the first and second types, time-diversity is provided. That is, the farther apart the symbols comprising a synchronisation signal of the first type are located, the less impact of channel fading. The same observation also holds for the separating the symbols comprising a synchronisation signal of the second type. It may be realised that the figures are just examples and it would be possible to separate the symbols even farther apart than illustrated in FIGS. 2E and 2F. Hence, an arrangement of this form (i.e., $l_1 \neq l_0+1$) offers maximum coherent detection gain (since the first and second types of synchronisation signals are located in contiguous symbols, $k_0=l_0 \pm 1$), while simultaneously enabling time-diversity by for both types of synchronisation signals, by separating the pairs of symbols sufficiently apart.

Figure 2G:
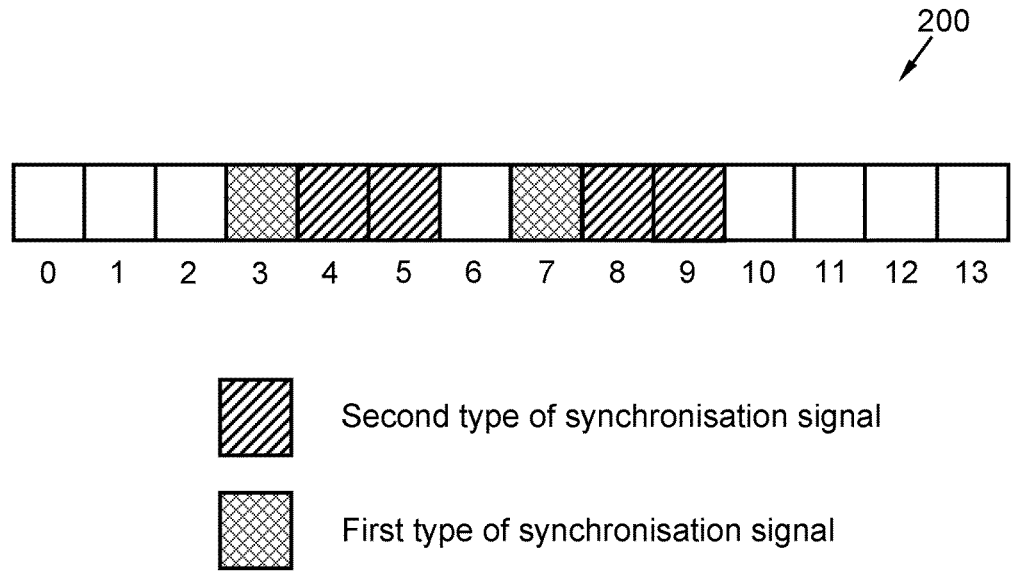
FIG. 2G is a block diagram illustrating a subframe comprising 14 symbols with positions dedicated to a first type of synchronisation signal and a second type of synchronisation signal, respectively, according to an embodiment.

FIG. 2G illustrates yet another embodiment of the subframe 200, comprising 14 symbols labelled from 0 to 13. In the illustrated example, there are two symbols (positions 3 and 7) comprising a synchronisation signal of the first type, and four symbols (positions 4, 5, 8 and 9) comprising a synchronisation signal of the second type. Thus $M_1=2$, $M_2=4$, $\Delta=1$, $\Delta_1=2$ and $l_1=l_0+3$.

Figure 2H:
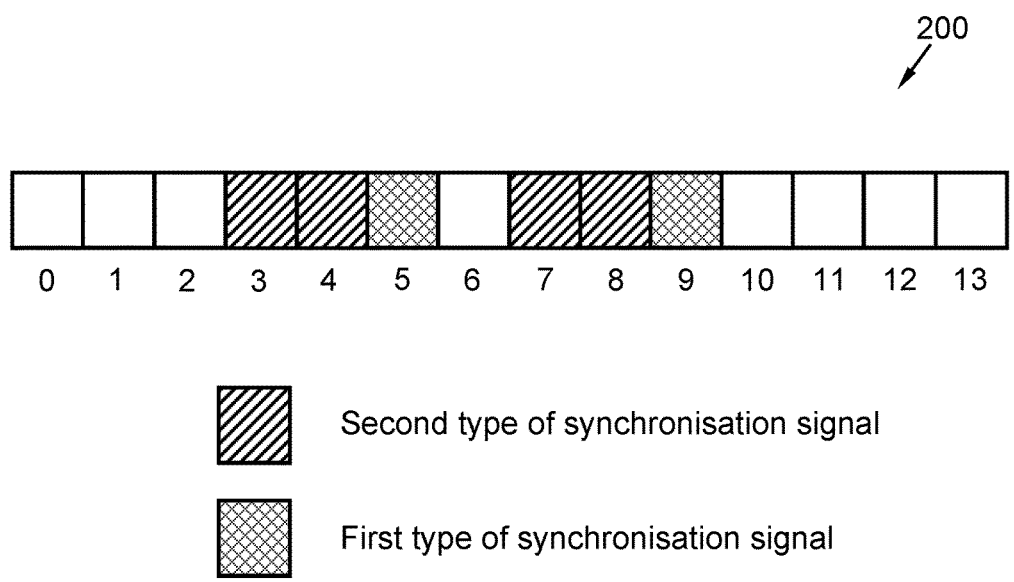
FIG. 2H is a block diagram illustrating a subframe comprising 14 symbols with positions dedicated to a first type of synchronisation signal and a second type of synchronisation signal, respectively, according to an embodiment.

FIG. 2H illustrates another embodiment of the subframe 200, comprising 14 symbols labelled from 0 to 13. In the illustrated example, there are two symbols (positions 5 and 9) comprising a synchronisation signal of the first type, and four symbols (positions 3, 4, 7 and 8) comprising a synchronisation signal of the second type. Thus $M_1=2$, $M_2=4$, $\Delta=-1$, $\Delta_1=-2$ and $l_1=l_0+3$.

An advantage of the illustrated embodiments in FIG. 2G and FIG. 2H, which are similar to that of FIGS. 2E and 2F, but may accommodate more symbols for the second type of synchronisation signal and thus improve the detection probability.

Figure 2I:
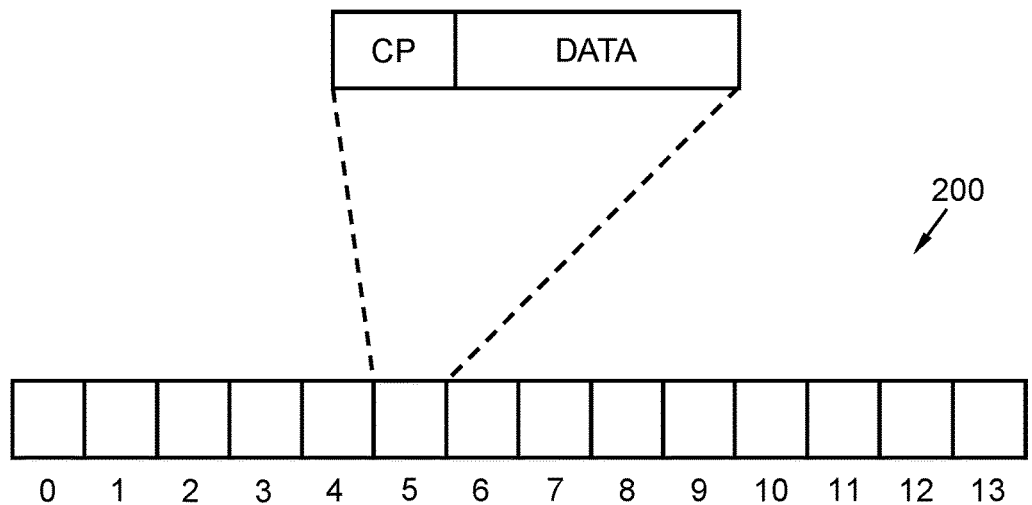
FIG. 2I is a block diagram illustrating a subframe comprising 14 symbols with positions dedicated to a first type of synchronisation signal and a second type of synchronisation signal, respectively, according to an embodiment.

A symbol, such as an OFDM or a SC-FDMA symbol, may comprise a data part and a Cyclic Prefix (CP), see FIG. 2I. In a further embodiment, it may be considered that all the N OFDM/SC-FDMA symbols do not have the same cyclic prefix length. For example in the prior art LTE system, for a subframe with N=14 OFDM/SC-FDMA symbols, symbol l=0 and l=7 include cyclic prefixes which are longer than the cyclic prefixes for the other symbols in the subframe 200.

In one embodiment, at least one of the N OFDM/SC-FDMA symbols has different cyclic prefix length than the other OFDM/SC-FDMA symbols. In order to avoid blind decoding of the OFDM/SC-FDMA symbol position of a synchronisation signal of the second type, it is disclosed to allocate the synchronisation signal of the first type to OFDM/SC-FDMA symbols having the same cyclic prefix length. Furthermore, synchronisation signals of the second type are also allocated to OFDM/SC-FDMA symbols with the same cyclic prefix length, which may not be the same as that for the synchronisation signals of the first type. This assures that the OFDM/SC-FDMA symbol position could be determined without blind decoding according to previous embodiments, even if the first type and second type of synchronisation signals are transmitted in OFDM/SC-FDMA symbols with different cyclic prefix lengths.

Figure 2J:
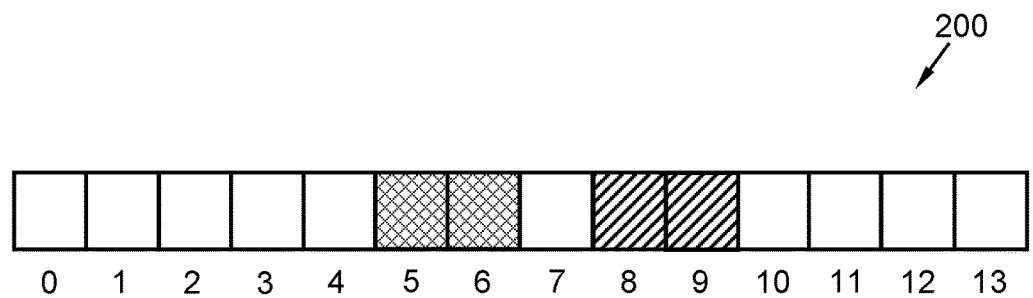
FIG. 2J is a block diagram illustrating a subframe comprising 14 symbols with positions dedicated to a first type of synchronisation signal and a second type of synchronisation signal, respectively, according to an embodiment.
Figure 2J:
Figure 2J:
Figure 8A:
FIG. 8A is a block diagram illustrating a subframe comprising two synchronisation bursts each comprising two symbols with a synchronisation signal, according to prior art.
Figure 8B:
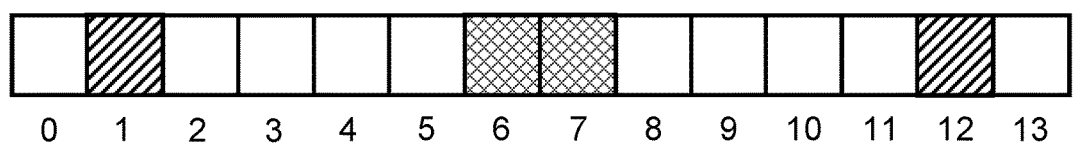
FIG. 8B is a block diagram illustrating a subframe with 14 symbols with positions dedicated to a first type of synchronisation signal and a second type of synchronisation signal, respectively, according to prior art.
Figure 8B:
Figure 8B:

As an example, referring to the prior art LTE system, subframes l=0 and l=7 may comprise synchronisation signals of the first type, or comprise synchronisation signals of the second type, or not comprise any synchronisation signals at all. FIG. 2J shows an example where all synchronisation signals are allocated to OFDM/SC-FDMA symbols having the same cyclic prefix length. This is achieved by setting $M_1=M_2=2$, $\Delta=3$, $l_1=l_0+1$ and $l_0=5$. It may also be noted that in the prior art as shown in FIG. 8B, the primary sidelink synchronization signal symbols are located in symbols l=6 and l=7, i.e., they have different cyclic prefix lengths.

Figure 2K:
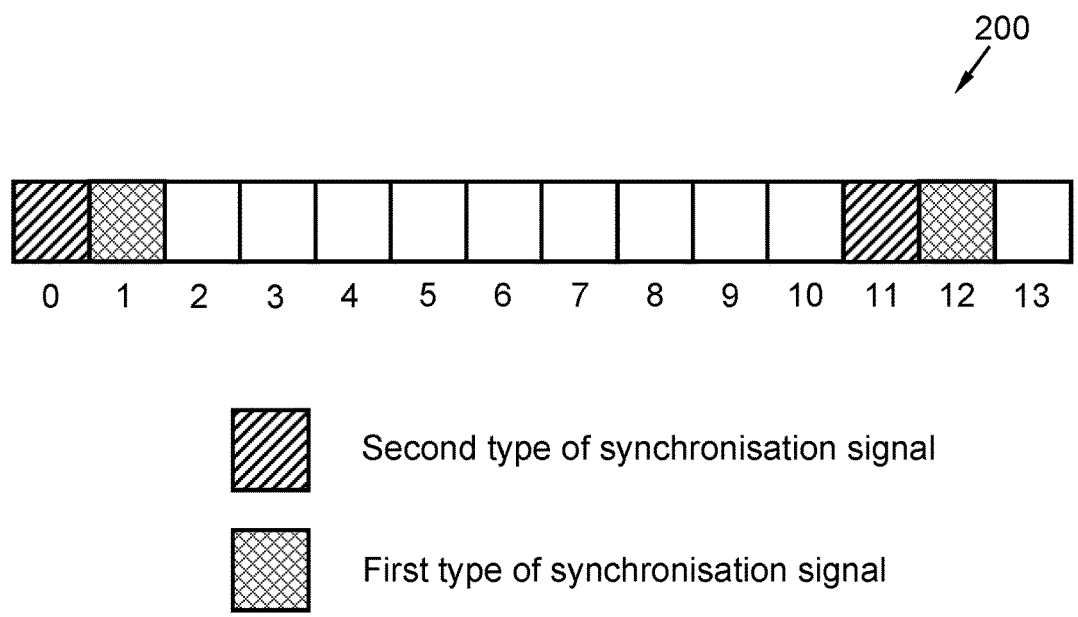
FIG. 2K is a block diagram illustrating a subframe comprising 14 symbols with positions dedicated to a first type of synchronisation signal and a second type of synchronisation signal, respectively, according to an embodiment.

FIG. 2K illustrates another example of a subframe 200 wherein pairs of synchronisation signals of the first type and second type respectively are located as far apart as possible within the subframe 200. Thereby advantages associated with maximum time-diversity is achieved while having maximum coherent detection gain, as the symbols comprising synchronisation signals of the first type and synchronisation signals of the second type are contiguous.

Figure 3A:
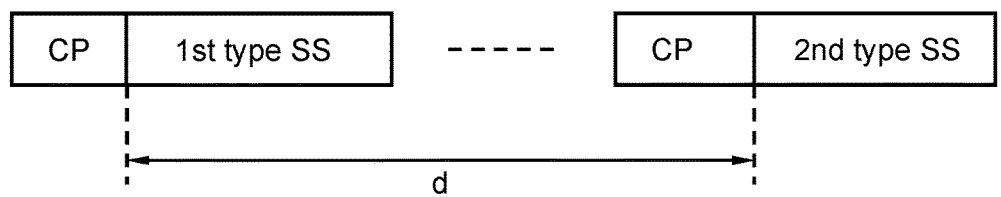
FIG. 3A is a block diagram illustrating a first symbol comprising a cyclic prefix and a data part of a first type of synchronisation signal and a second symbol comprising a cyclic prefix and a data part of a second type of synchronisation signal.
Figure 3B:
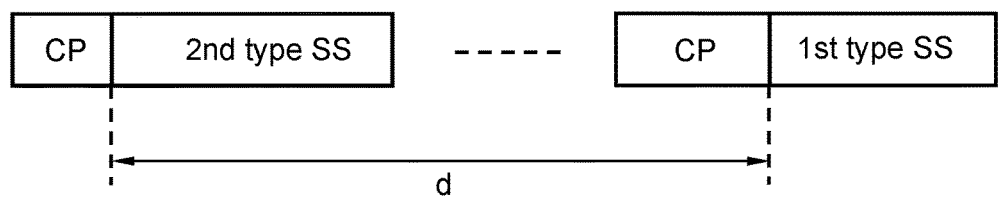
FIG. 3B is a block diagram illustrating a first symbol comprising a cyclic prefix and a data part of a first type of synchronisation signal and a second symbol comprising a cyclic prefix and a data part of a second type of synchronisation signal.

FIG. 3A and FIG. 3B illustrate the distance d for two different orderings of the synchronisation signals.

It may be realised that a condition for avoiding blind detection of the second type of synchronisation signal is that the distance d, which is the spacing between the first instant of the first type of synchronisation signal and the first instant of the second type of synchronisation signal, is constant for all OFDM/SC-FDMA symbols containing the first type of synchronisation signals. This allows determining the position of the second type of synchronisation signal unambiguously even if the different types of synchronisation signals are located in OFDM/SC-FDMA symbols with different cyclic prefix length. Thus, $k_j=l_i+\Delta$, $\forall l_i$, where $|\Delta|>0$ subject to that the distance d between symbol $k_i$ and $l_i$ may be fixed for all symbols $l_i$.

Thereby, the described methods may comprise improvement of the synchronisation performance for synchronising the transmitter 110 and the receiver 120, by locating synchronisation signals in vicinity of each other such that coherent detection may be utilised. Also, by defining predefined symbol spacing relations between synchronisation signals such that blind detection may be avoided.

Furthermore, power saving may be improved in the transmitter 110 when the synchronisation signals are located contiguously, as the power amplifier of the transmitter 110 may be switched off in between the transmitted signal bursts.

In some further, not illustrated embodiments, the synchronisation signals may be distributed in the symbols of the subframe 200 according to minor variations of the above explicitly stated specifications. Also, the described transmitter 110, receiver 120 and methods may be applied in any system, wherein two types of synchronisation signals are transmitted in bursts.

Figure 4:
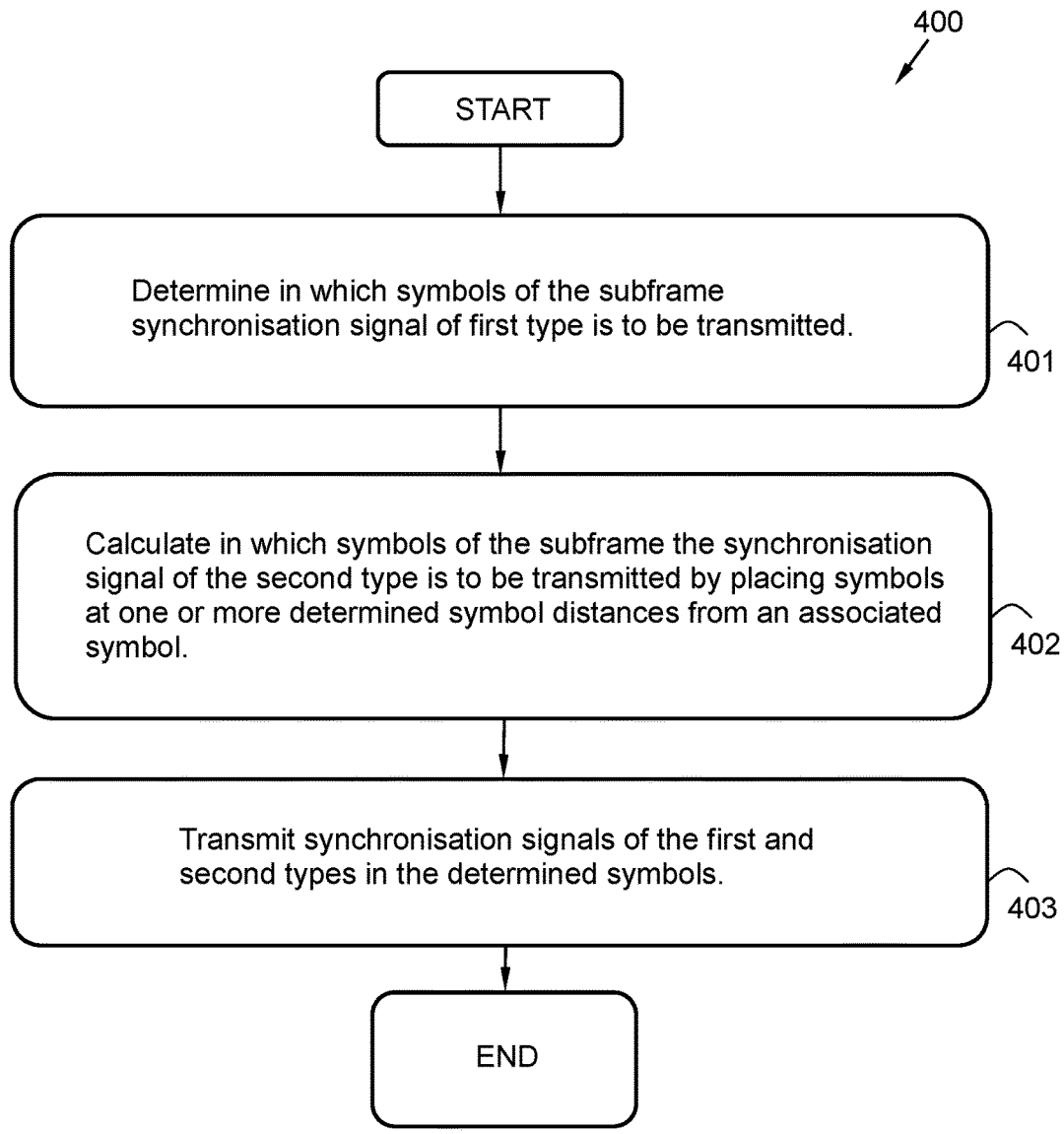
FIG. 4 is a flow chart illustrating a method in a transmitter according to an embodiment.

FIG. 4 is a flow chart illustrating embodiments of a method 400 for use in a transmitter 110, for transmitting a first type of synchronisation signal in $M_1$ symbols $l_i$, $0 \leq i \leq (M_1-1)$ of a subframe 200 and a second type of synchronisation signal, comprising $M_2$ symbols $k_j$, $0 \leq j \leq (M_2-1)$ in the subframe 200. The subframe 200 comprises N symbols, wherein $N \geq M_2 \geq M_1 \geq 2$.

The $M_1$ symbols $l_i$ may in some embodiments have an equal cyclic prefix length and/or the $M_2$ symbols $k_j$ may have an equal cyclic prefix length.

The number of symbols $l_i$, $k_j$ may be the same for the first type and the second type of synchronisation signals in some embodiments, such that $M_1=M_2$ and the set of integer offset values $\Delta_j$ may comprise one single offset value.

The $M_2$ number of symbols $k_j$ may in some embodiments exceed the $M_1$ number of symbols $l_i$ and the set of offset values $\Delta_j$ may comprise a plurality of distinct integer offset values $\Delta_j$, defining the respective determined symbol distance between each of the $M_2$ symbols $k_j$ and the respective associated symbol $l_i$, such that: $k_j=l_i+\Delta_j$, wherein $\Delta_j \in \{0, 1, \ldots, N-1\}$.

The first type of synchronisation signal and the second type of synchronisation signal are dedicated for Device-to-Device, D2D, communication and the transmitter 110 may comprise a non-stationary unit, such as, e.g., a mobile station or UE.

Also, the first type of synchronisation signal, and/or the second type of synchronisation signal may be based on any of Orthogonal Frequency-Division Multiplexing (OFDM) or Single Carrier-Frequency Division Multiple Access (SC-FDMA) in different embodiments.

Furthermore, the transmitter 110 may be a user equipment (UE) operating within a 3rd Generation Partnership Project Long Term Evolution (3GPP LTE system) and wherein the synchronisation signals of the first type comprises primary sidelink synchronization signals and wherein the synchronisation signals of the second type comprises secondary sidelink synchronization signals, in some embodiments.

To transmit the first and second synchronisation signals, the method 400 may comprise a number of actions 401-403. It is however to be noted that any, some or all of the described actions 401-403, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 400 may comprise the following actions:

Action 401

It is determined in which $M_1$ symbols $l_i$ of the subframe 200, the synchronisation signal of the first type is to be transmitted.

The $M_1$ symbols $l_i$ may in some embodiments be determined to be contiguously located in subsequent symbols $l_i$, such that: $l_{i+1}=l_i+1$.

However, in some embodiments, the $M_1$ symbols $l_i$ may be determined to be distantly located from each other, such that: $l_{i+1} \geq l_i+N-3$.

Action 402

The $M_2$ symbols $k_j$ are placed at a one or more determined 401 symbol distance from an associated symbol $l_i$ of the subframe 200, according to a calculation of when the synchronisation signal of the second type is to be transmitted, wherein said one or more determined symbol distance between each of the $M_2$ symbols $k_j$ and the respective associated symbol $l_i$ is equal between all of the $M_1$ symbols $l_i$ in the subframe 200 and their respective associated $M_2$ symbols $k_j$.

The one or more symbol distance between the determined 401 $M_1$ symbols $l_i$ and each of the associated $M_2$ symbols $k_j$ may be determined 401 from the first time instance after the cyclic prefix of the symbols $l_i$, $k_j$.

The calculation of the one or more determined 401 symbol distance between each of the $M_2$ symbols $k_j$ and the respective associated symbol $l_i$, may in some embodiments be based on a set of integer offset values $\Delta_j$, which is known by a receiver 120, and by calculating: $k_j = l_i + \Delta_j$, $\forall l_i$, where $|\Delta_j| > 0$, $(k_j, l_i) \in \{0,1, \ldots, N-1\}$.

The set of integer offset values $\Delta_j$ may in some embodiments comprise $|\Delta|=1$, 2 and/or 3.

Action 403

The synchronisation signal of the first type is transmitted in the determined 401 $M_1$ symbols $l_i$ of the subframe 200, and the synchronisation signal of the second type in the calculated 402 $M_2$ symbols $k_j$ of the subframe 200.

The synchronisation signal may, in some embodiments, be transmitted over multiple hops between the transmitter 110 and the receiver 120, via one or more intermediate other nodes 140.

Figure 5:
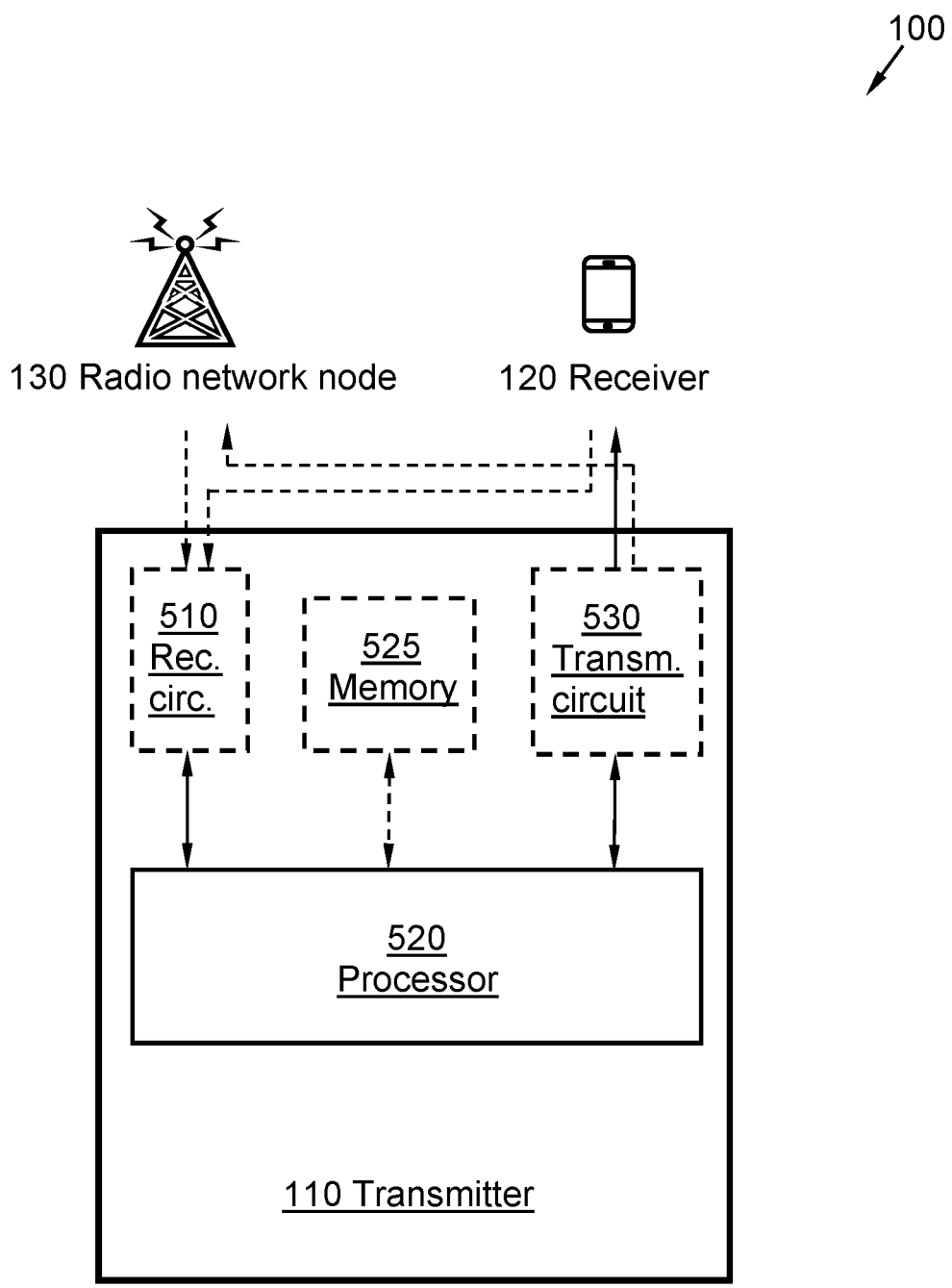
FIG. 5 is a block diagram illustrating a transmitter according to an embodiment.

FIG. 5 illustrates an embodiment of a transmitter 110, configured to transmit a first type of synchronisation signal, in $M_1$ symbols $l_i$, $0 \leq i \leq (M_1-1)$ of a subframe 200 and a second type of synchronisation signal in $M_2$ symbols $k_j$, $0 \leq j \leq (M_2-1)$ of the subframe 200. The subframe 200 comprises N symbols, wherein $N \geq M_2 \geq M_1 \geq 2$.

Further, the illustrated transmitter 110 is configured to perform the method 400 according to any, some or all of the previously discussed actions 401-403.

The first type of synchronisation signal and the second type of synchronisation signal may be dedicated for Device-to-Device (D2D) communication and the transmitter 110 may comprise a non-stationary unit.

Further, the transmitter 110 may comprise a user equipment (UE), operating within a 3rd Generation Partnership Project Long Term Evolution (3GPP LTE) system, and wherein the synchronisation signals of the first type comprises primary sidelink synchronization signals and wherein the synchronisation signals of the second type comprises secondary sidelink synchronization signals.

In further addition, the first type of synchronisation signal, and/or the second type of synchronisation signal may be based on any of Orthogonal Frequency-Division Multiplexing (OFDM), or Single Carrier-Frequency Division Multiple Access (SC-FDMA).

For enhanced clarity, any internal electronics or other components of the transmitter 110, not completely indispensable for understanding the herein described embodiments have been omitted from FIG. 5.

The transmitter 110 comprises a processor 520, configured to determine in which symbols $l_i$ of the subframe 200 the synchronisation signal of the first type is to be transmitted, and in addition configured to calculate in which symbols $k_j$ of the subframe 200, the synchronisation signal of the second type is to be transmitted, by placing each of the $M_2$ symbols $k_j$ at a one or more determined symbol distance from an associated symbol $l_i$, wherein said one or more determined symbol distance between each of the $M_2$ symbols $k_j$ and the respective associated symbol $l_i$ is equal for all of the $M_1$ symbols $l_i$ in the subframe 200.

The one or more symbol distance between the determined $M_1$ symbols $l_i$ and each of the associated $M_2$ symbols $k_j$ may in some embodiments determined from the first time instance after the cyclic prefix of the symbols $l_i$, $k_j$.

The processor 520 may be further configured to calculate the one or more determined symbol distance between each of the $M_2$ symbols $k_j$ and the respective associated symbol $l_i$, based on a set of integer offset values $\Delta_j$, which is known by a receiver 120, and by calculating: $k_j = l_i + \Delta_j$, $\forall l_i$, where $|\Delta_j| > 0$, $(k_j, l_i) \in \{0,1, \ldots, N-1\}$.

Furthermore, the processor 520 may be further configured to establish the set of offset values $\Delta_j$ such that: $|\Delta|=1$, 2 and/or 3.

Also, according to some embodiments, the processor 520 may be further configured to determine to contiguously locate the $M_1$ symbols $l_i$ in subsequent symbols $l_i$ such that: $l_{i+1}=l_i+1$.

Further, in some embodiments, the processor 520 may be further configured to determine to locate the $M_1$ symbols $l_i$ distantly from each other, such that: $l_{i+1} \geq l_i+N-3$.

According to some embodiments, the $M_1$ symbols $l_i$ may have an equal cyclic prefix length and/or the $M_2$ symbols $k_j$ may have an equal cyclic prefix length.

Furthermore, the number of symbols $l_i$, $k_j$ is the same for the first type and the second type of synchronisation signals, such that $M_1=M_2$ and the set of integer offset values $\Delta_j$ comprises one single offset value.

In some embodiments, the $M_2$ number of symbols $k_j$ may exceed the $M_1$ number of symbols $l_i$ and the set of offset values $\Delta_j$ may comprise a plurality of distinct integer offset values $\Delta_j$, defining the respective determined symbol distance between each of the $M_2$ symbols $k_j$ and the respective associated symbol $l_i$, such that: $k_j = l_i + \Delta_j$, wherein $\Delta_j \in \{0,1, \ldots, N-1\}$.

Such processor 520 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The transmitter 110 also may comprise a transmitting circuit 530, configured to transmit the synchronisation signals of the first type in the determined $M_1$ symbols $l_i$ of the subframe 200, and to transmit the synchronisation signals of the second type in the calculated $M_2$ symbols $k_j$ of the subframe 200.

In further addition, the transmitter 110 may also comprise a receiving circuit 510, configured for receiving signals, such as, e.g., synchronisation signals, from other network nodes 120, 130, 140 over a wireless interface according to some embodiments.

Furthermore, the transmitter 110 may further comprise at least one memory 525, according to some embodiments. The optional memory 525 may comprise a physical device utilised to store data or a program, i.e., a sequence of instructions, on a temporary or permanent basis. According to some embodiments, the memory 525 may comprise integrated circuits comprising silicon-based transistors. Further, the memory 525 may be volatile or non-volatile.

Some or all of the above described actions 401-403 to be performed in the transmitter 110 may be implemented through the one or more processors 520 in the transmitter 110, together with a computer program product for performing at least some of the functions of the actions 401-403. Thus a computer program comprising program code may perform a method 400 according to any, at least some, or all of the functions of the actions 401-403 for transmitting synchronisation signals, when the computer program is loaded into a processor 520 of the transmitter 110.

Further, a computer program product may comprise a computer readable storage medium storing program code thereon for use by the transmitter 110, for transmitting a first type of synchronisation signal in $M_1$ symbols $l_i$, $0 \leq i \leq (M_1-1)$ of a subframe 200 and a second type of synchronisation signal, comprising $M_2$ symbols $k_j$, $0 \leq j \leq (M_2-1)$ in the subframe 200. The subframe 200 comprises N symbols, wherein $N \geq M_2 \geq M_1 \geq 2$. The program code comprising instructions for executing a method 400 that comprises determining 401 in which $M_1$ symbols $l_i$ of the subframe (200), the synchronisation signal of the first type is to be transmitted; calculating 402 in which $M_2$ symbols $k_j$ of the subframe 200, the synchronisation signal of the second type is to be transmitted by placing the $M_2$ symbols $k_j$ at a one or more determined symbol distance from an associated symbol $l_i$, wherein said one or more determined symbol distance between each of the $M_2$ symbols $k_j$ and the respective associated symbol $l_i$ is equal between all of the $M_1$ symbols $l_i$ in the subframe 200 and their respective associated $M_2$ symbols $k_j$; and transmitting 403 the synchronisation signal of the first type in the determined $M_1$ symbols $l_i$ of the subframe 200, and the synchronisation signal of the second type in the calculated $M_2$ symbols $k_j$ of the subframe 200.

The computer program product mentioned above may be provided for instance in the form of a data carrier carrying computer program code for performing at least some of the actions 401-403 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the transmitter 110 remotely, e.g., over an Internet or an intranet connection.

Figure 6:
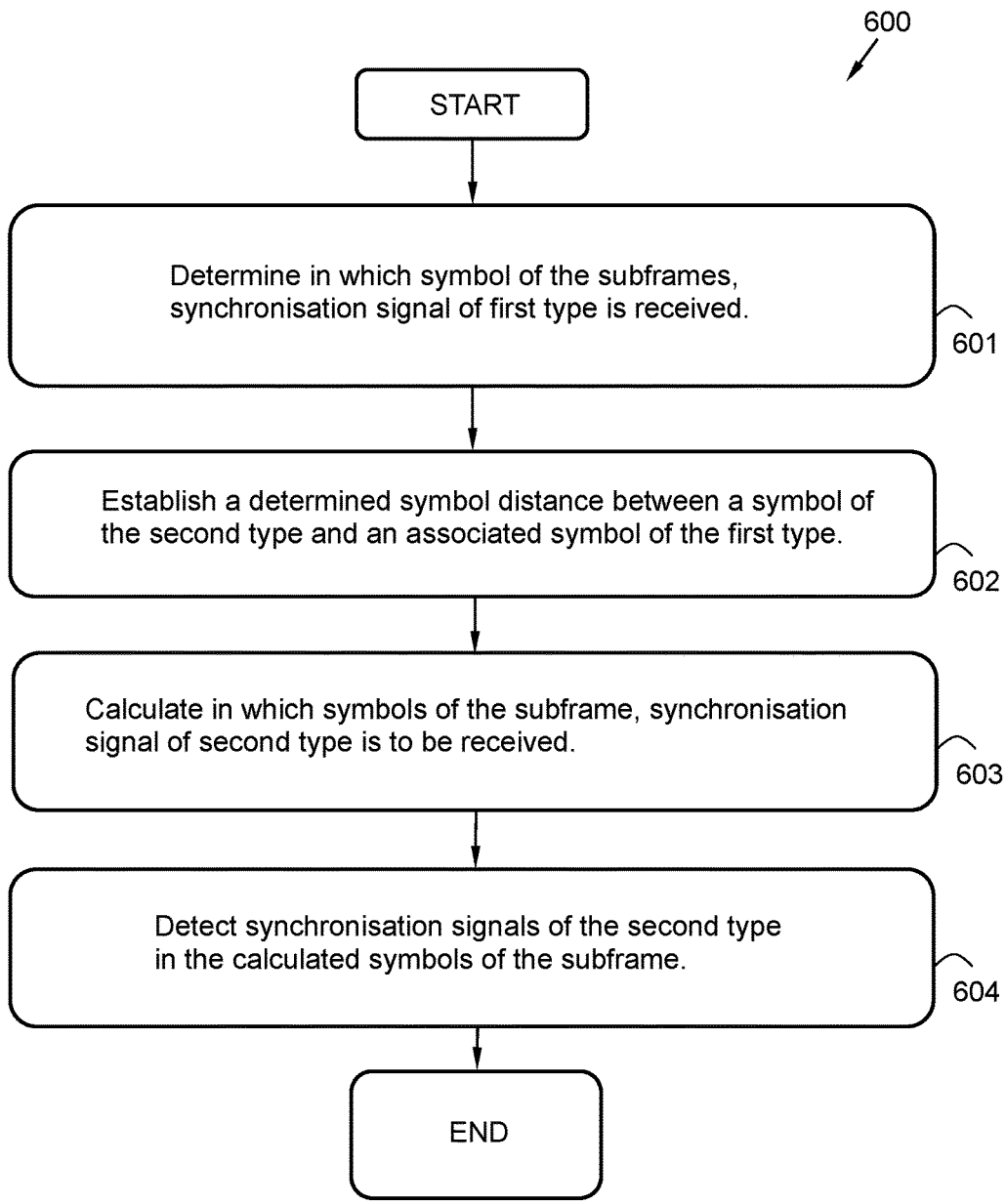
FIG. 6 is a flow chart illustrating a method in a receiver according to an embodiment.

FIG. 6 is a flow chart illustrating embodiments of a method 600 for use in a receiver 120 for detecting a first type of synchronisation signal, in $M_1$ symbols $l_i$, $0 \leq i \leq (M1-1)$ of a subframe 200 and a second type of synchronisation signal, in M2 symbols kj; received in the subframe 200. The subframe 200 comprises N symbols, wherein $N \geq M_2 \geq M_1 \geq 2$.

The $M_1$ symbols $l_i$ may in some embodiments have an equal cyclic prefix length and/or the $M_2$ symbols $k_j$ may have an equal cyclic prefix length.

The number of symbols $l_i$, $k_j$ may be the same for the first type and the second type of synchronisation signals in some embodiments, such that $M_1=M_2$ and the set of integer offset values $\Delta_j$ may comprise one single offset value.

The $M_2$ number of symbols $k_j$ may in some embodiments exceed the $M_1$ number of symbols $l_i$ and the set of offset values $\Delta_j$ may comprise a plurality of distinct integer offset values $\Delta_j$, defining the respective determined symbol distance between each of the $M_2$ symbols $k_j$ and the respective associated symbol $l_i$, such that: $k_j = l_i + \Delta_j$, wherein $\Delta_j \in \{0, 1, \ldots, N-1\}$.

The first type of synchronisation signal and the second type of synchronisation signal may be dedicated for Device-to-Device, D2D, communication and the receiver 120 may comprises a non-stationary unit, such as, e.g., a mobile station or UE.

Also, the first type of synchronisation signal, and/or the second type of synchronisation signal may be based on any of Orthogonal Frequency-Division Multiplexing (OFDM) or Single Carrier-Frequency Division Multiple Access (SC-FDMA) in different embodiments.

Furthermore, the receiver 120 may be a user equipment (UE) operating within a 3rd Generation Partnership Project Long Term Evolution (3GPP LTE system) and wherein the synchronisation signals of the first type comprises primary sidelink synchronization signals and wherein the synchronisation signals of the second type comprises secondary sidelink synchronization signals, in some embodiments.

To receive the first and second synchronisation signals, the method 600 may comprise a number of actions 601-604. It is however to be noted that any, some or all of the described actions 601-604, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 600 may comprise the following actions:

Action 601

It is determined in which $M_1$ symbols $l_i$ of the subframe 200, the synchronisation signal of the first type is received.

The $M_1$ symbols $l_i$ may in some embodiments be determined to be contiguously located in subsequent symbols $l_i$, such that: $l_{i+1} = l_i + 1$.

However, in some embodiments, the $M_1$ symbols $l_i$ may be determined to be distantly located from each other, such that: $l_{i+1} \geq l_i + N - 3$.

Action 602

A one or more determined symbol distance between each of the $M_2$ symbols $k_j$ and the respective associated symbol $l_i$ is established, which is equal for all of the $M_1$ symbols $l_i$ in the subframe 200.

The one or more symbol distance between the determined 601 $M_1$ symbols $l_i$ and each of the associated $M_2$ symbols $k_j$ may be determined 601 from the first time instance after the cyclic prefix of the symbols $l_i$, $k_j$.

Action 603

Furthermore, it is calculated in which $M_2$ symbols $k_j$ of the subframe 200, the synchronisation signal of the second type is to be received.

The calculation may in some embodiments be based on a set of integer offset values $\Delta_j$, which is known by a receiver 120, and by calculating: $k_j = l_i + \Delta_j$, $\forall l_i$, where $|\Delta_j| > 0$, $(k_j, l_i) \in \{0, 1, \ldots, N-1\}$.

The set of integer offset values $\Delta_j$ may in some embodiments comprise $|\Delta| = 1$, 2 and/or 3.

Action 604

The $M_2$ synchronisation signal of the second type is detected in the calculated 603 $M_2$ symbols $k_j$ of the subframe 200.

Figure 7:
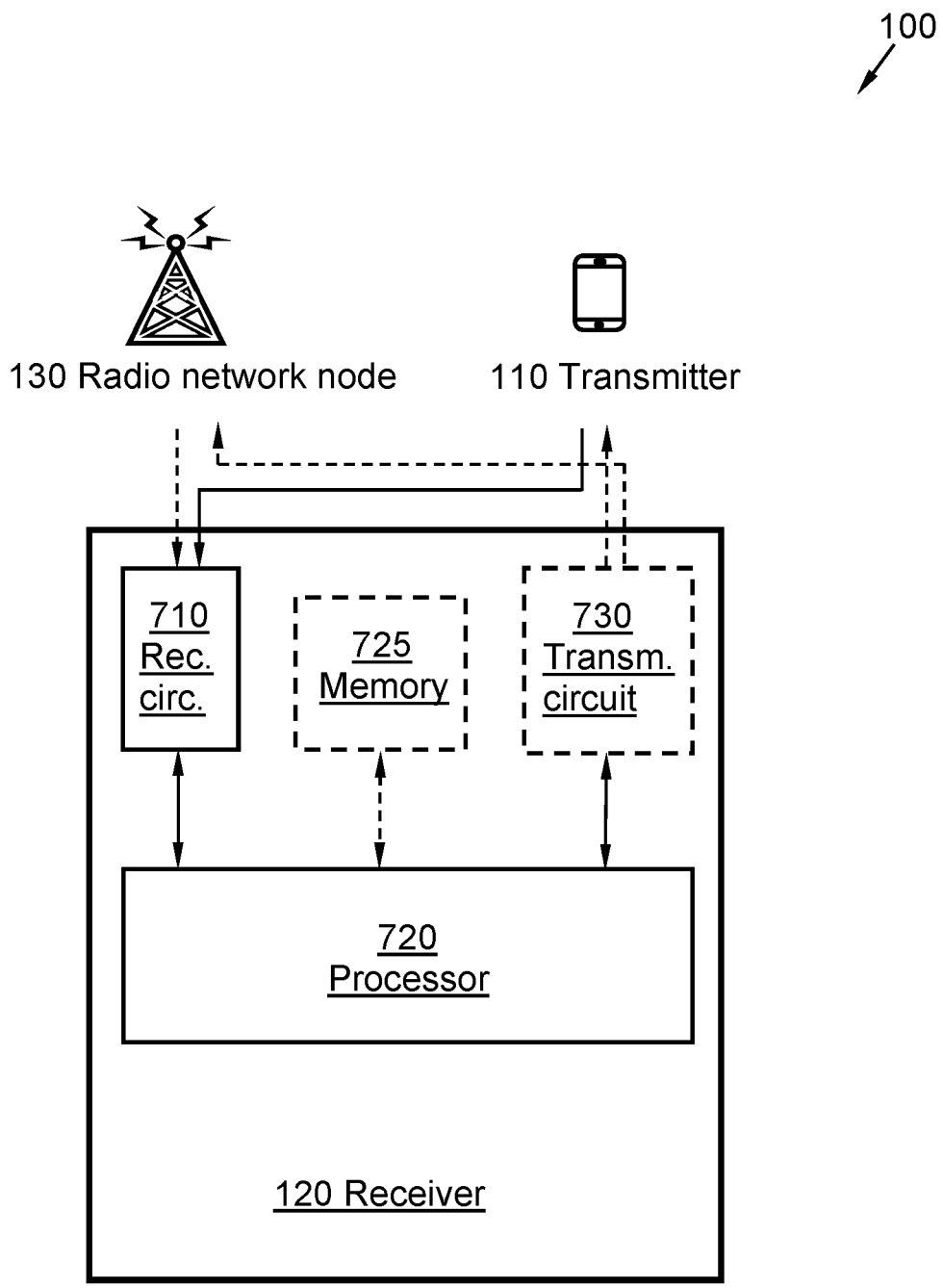
FIG. 7 is a block diagram illustrating a receiver according to an embodiment.

FIG. 7 illustrates an embodiment of a receiver 120, configured to detect a received synchronisation signal in $M_1$ symbols $l_i$, $0 \le i \le (M_1 - 1)$ of a subframe 200 and a second type of synchronisation signal, in $M_2$ symbols $k_j$, $0 \le j \le (M_2 - 1)$. The signals are received in a subframe 200 comprising N symbols, wherein $N \ge M_2 \ge M_1 \ge 2$.

The receiver 120 is configured to perform the above described method 600, according to at least some actions 601-604.

The first type of synchronisation signal and the second type of synchronisation signal may be dedicated for Device-to-Device, D2D, communication and the receiver 120 may comprises a non-stationary unit, such as, e.g., a mobile station or UE.

Also, the first type of synchronisation signal, and/or the second type of synchronisation signal may be based on any of Orthogonal Frequency-Division Multiplexing (OFDM) or Single Carrier-Frequency Division Multiple Access (SC-FDMA) in different embodiments.

Furthermore, the receiver 120 may be a user equipment (UE) operating within a 3rd Generation Partnership Project Long Term Evolution (3GPP LTE system) and wherein the synchronisation signals of the first type comprises primary sidelink synchronization signals and wherein the synchronisation signals of the second type comprises secondary sidelink synchronization signals, in some embodiments.

For enhanced clarity, any internal electronics or other components of the receiver 120, not completely indispensable for understanding the herein described embodiments have been omitted from FIG. 6.

The receiver 120 comprises a receiving circuit 710, configured for receiving a signal such as, e.g., a synchronisation signal, from, e.g., the transmitter 110. The received signal, i.e., synchronisation signal may be of the first type in the $M_1$ symbols $l_i$ of the subframe 200.

However, the receiving circuit 710 may be configured for receiving radio signals of various types over a wireless interface from a plurality of transmitting entities, such as other network nodes 140, or the radio network node 130.

In addition the receiver 120 comprises a processor 720, configured to establish a one or more determined symbol distance between a symbol $k_j$ and an associated symbol $l_i$, and in addition configured to calculate in which $M_2$ symbols $k_j$ of the subframe 200, the synchronisation signal of the second type is to be detected. The one or more determined symbol distance between each of the $M_2$ symbols $k_j$ and the respective associated symbol $l_i$ is equal for all of the $M_1$ symbols $l_i$ in the subframe 200.

The processor 720 may also be configured to calculate the one or more determined symbol distance between each of the $M_2$ symbols $k_j$ and the respective associated symbol $l_i$, based on a set of offset values $\Delta_j$, and by calculating: $k_j = l_i + \Delta_j$, $\forall l_i$, where $|\Delta| > 0$, $(k_j, l_i) \in \{0, 1, \ldots, N-1\}$.

Such processor 720 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the receiver 120 may also in some embodiments comprise a transmitting circuit 730, configured for transmitting a wireless signal comprising, e.g., a synchronisation signal.

Furthermore, the receiver 120 may further comprise at least one memory 725, according to some embodiments. The optional memory 725 may comprise a physical device utilised to store data or programs, i.e., sequences of instructions, on a temporary or permanent basis. According to some embodiments, the memory 725 may comprise integrated circuits comprising silicon-based transistors. Further, the memory 725 may be volatile or non-volatile.

The terminology used in the description of the embodiments as illustrated in the accompanying drawings is not intended to be limiting of the described methods 400, 600; transmitter 110 and/or receiver 120. Various changes, substitutions and/or alterations may be made, without departing from the disclosure as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. The term "or" as used herein, is to be interpreted as a mathematical OR, i.e., as an inclusive disjunction; not as a mathematical exclusive OR (XOR), unless expressly stated otherwise. A single unit such as, e.g., a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A user equipment (UE) in a wireless communication network for transmitting a synchronisation signal of a first type in $M_1$ symbols $l_i$, $0 \le i \le (M_1 - 1)$, of a subframe, and a synchronisation signal of a second type in $M_2$ symbols $k_j$, $0 \le j \le (M_2 - 1)$, of the subframe for synchronising the UE with a receiver in the wireless communication network, wherein the synchronisation signal of the second type is detected by the receiver based on relative positions of the synchronisation signals of the first and second types in the transmission, the UE comprising:

a processor configured to:
determine in which symbols $l_i$ of the subframe the synchronisation signal of the first type is to be transmitted, and determine in which symbols $k_j$ of the subframe the synchronisation signal of the second type is to be transmitted by placing each of the $M_2$ symbols $k_j$ at a symbol distance from an associated symbol $l_i$, wherein the symbol distance between each of the $M_2$ symbols $k_j$ and the respective associated symbol $l_i$ is previously known to the receiver; and a transmitting circuit configured to cooperate with the processor to:

transmit the synchronisation signal of the first type in the determined $M_1$ symbols $l_i$ of the subframe, and transmit the synchronisation signal of the second type in the determined $M_2$ symbols $k_j$ of the subframe, wherein the symbol distance between each of the $M_2$ symbols $k_j$ and the respective associated symbol $l_i$ is the symbol distance known by the receiver;

wherein the subframe comprises N symbols and at least one of the N symbols has a cyclic prefix length different than the cyclic prefix lengths of other ones of the N symbols, where $N > M_2 \geq M_1 \geq 2$, wherein the synchronisation signal of the first type only occupies the $M_1$ symbols $l_i$ within the subframe, wherein the synchronisation signal of the second type only occupies the $M_2$ symbols $k_j$ within the subframe, and wherein the $M_1$ symbols $l_i$ have an equal cyclic prefix length, and the $M_2$ symbols $k_j$ have an equal cyclic prefix length, and switch off a transmitter amplifier after transmitting symbols holding the synchronisation signals of the first and second types, when the synchronisation signals of the first and second types are contiguous.

2. The UE according to claim 1, wherein the processor is configured to determine the symbol distance between each of the $M_2$ symbols $k_j$ and the respective associated symbol $l_i$ is based on a set of integer offset values $\Delta_j$, which is known by the receiver, and wherein:

$$k_j = l_i + \Delta_j, \forall l_i, \text{ where } |\Delta_j| > 0, (k_j, l_i) \in \{0, 1, \ldots, N-1\}.$$

3. The UE according to claim 2, wherein the processor is configured to establish the set of offset values $\Delta_j$ such that:

$$|\Delta| = 1, 2 \text{ or } 3.$$

4. The UE according to claim 1, wherein the $M_1$ symbols $l_i$ are determined to be contiguously located in subsequent symbols $l_j$, such that:

$$l_{i+1} = l_i + 1.$$

5. The UE according to claim 1, wherein the $M_1$ symbols $l_i$ are determined to be distantly located from each other, such that:

$$l_{i+1} \leq l_i + N - 3.$$

6. The UE according to claim 1, wherein $M_1 = M_2$.

7. The UE according to claim 1, wherein the synchronisation signal of the first type and the synchronisation signal of the second type are dedicated for device-to-device communication.

8. The UE according to claim 1, wherein:

the synchronisation signal of the first type comprises primary sidelink synchronization signal, and the synchronisation signal of the second type comprises secondary sidelink synchronization signal.

9. The UE according to claim 1, wherein at least one of the synchronisation signal of the first type and the synchronisation signal of the second type is based on any of orthogonal frequency-division multiplexing (OFDM) and single carrier-frequency division multiple access (SC-FDMA).

10. A method performed by a user equipment (UE) in a wireless communication network for transmitting a synchronisation signal of a first type in $M_1$ symbols $l_i$, $0 \leq i \leq (M_1 - 1)$, of a subframe and a synchronisation signal of a second type in $M_2$ symbols $k_j$, $0 \leq j \leq (M_2 - 1)$, in the subframe for synchronising the UE with a receiver in the wireless communication network, wherein the synchronisation signal of the second type is detected by the receiver based on relative positions of the synchronisation signals of the first and second types in the transmission, the method comprising:

determining in which $M_1$ symbols $l_i$ of the subframe, the synchronisation signal of the first type is to be transmitted to the receiver;

determining in which $M_2$ symbols $k_j$ of the subframe the synchronisation signal of the second type is to be transmitted to the receiver by placing each of the $M_2$ symbols $k_1$ at a symbol distance from an associated symbol $l_i$, wherein the symbol distance between each of the $M_2$ symbols $k_1$ and the respective associated symbol $l_i$ is previously known to the receiver;

transmitting to the receiver the synchronisation signal of the first type in the determined $M_1$ symbols $l_i$ of the subframe and the synchronisation signal of the second type in the determined $M_2$ symbols $k_j$ of the subframe, wherein the symbol distance between each of the $M_2$ symbols $k_j$ and the respective associated symbol $l_i$ is the symbol distance known by the receiver, wherein the subframe comprises N symbols with $N > M_2 > M_1 > 2$ and at least one of the N symbols has a cyclic prefix length different than the cyclic prefix lengths of other ones of the N symbols, wherein the synchronisation signal of the first type only occupies the $M_1$ symbols $l_i$ within the subframe, wherein the synchronisation signal of the second type only occupies the $M_2$ symbols $k_j$ within the subframe, and wherein the $M_1$ symbols $l_i$ have an equal cyclic prefix length, and the $M_2$ symbols $k_j$ have an equal cyclic prefix length; and switching off a transmitter amplifier after transmitting symbols holding the synchronisation signals of the first and second types, when the synchronisation signals of the first and second types are contiguous.

11. A wireless communication network including user equipment (UE) configured to detect a synchronisation signal of a first type in $M_1$ symbols $l_i$, $0 \leq i \leq (M_1 - 1)$, of a subframe and a synchronisation signal of a second type in $M_2$ symbols $k_j$, $0 \leq j \leq (M_2 - 1)$, in the subframe for synchronising the UE with a transmitter in the wireless communication network, wherein the subframe comprises N symbols and at least one of the N symbols has a cyclic prefix length different than the cyclic prefix lengths of other ones of the N symbols, wherein $N > M_2 > M_1 > 2$, the UE comprising:

a processor; and a receiving circuit configured to cooperate with the processor to receive from the transmitter the synchronisation signal of the first type in the $M_1$ symbols $l_i$ of the subframe and the synchronisation signal of the second type in the $M_2$ symbols $k_1$ of the subframe, wherein the processor is configured to:

prior to receiving the subframe, establish a symbol distance between each of the $M_2$ symbols $k_j$ of the synchronisation signal of the second type and each of the $M_1$ symbols $l_i$ of the synchronisation signal of the first type, and determine in which $M_2$ symbols $k_j$ of the subframe the synchronisation signal of the second type is to be detected based on the established symbol distance, wherein the synchronisation signal of the first type only occupies the $M_1$ symbols $l_j$ within the subframe, the synchronisation signal of the second type only occupies the $M_2$ symbols $k_j$ within the subframe, the $M_1$ symbols $l_j$ have equal cyclic prefix lengths, and the $M_2$ symbols $k_j$ have equal cyclic prefix lengths, and wherein an amplifier of the transmitter is switched off after transmission of symbols holding synchronisation signals of the first and second types when the synchronisation signals of the first and second type are contiguous.

12. The wireless communication network according to claim 11, wherein the processor is configured to determine the symbol distance between each of the $M_2$ symbols $k_j$ and the respective associated symbol $l_i$, based on a set of offset values $\Delta_j$, and wherein:

$k_j = l_i + \Delta_j, \forall l_i$, where $|\Delta_j| \geq 0, (k_j, l_i) \in \{0,1, \ldots, N-1\}$.

13. A method performed by a wireless communication network for detecting a synchronisation signal of a first type in $M_1$ symbols $l_i$, $0 \leq i \leq (M_1-1)$, of a subframe, and a synchronisation signal of a second type in $M_2$ symbols $k_j$, $0 \leq j \leq (M_2-1)$, in the subframe for synchronising a user equipment (UE) with a transmitter in the wireless communication network, the method comprising:

receiving, by the UE, the synchronisation signal of the first type in the $M_1$ symbols $l_i$ of the subframe and the synchronisation signal of the second type in the $M_2$ symbols $k_j$ of the subframe;

determining, by the UE, in which $M_1$ symbols $l_i$ of the subframe the synchronisation signal of the first type is received;

prior to receiving the subframe, establishing, by the UE, a symbol distance between each of the $M_2$ symbols $k_j$ of the synchronisation signal of the second type and each of the $M_1$ symbols $l_i$ of the synchronisation signal of the first type;

determining, by the UE, in which $M_2$ symbols $k_j$ of the subframe the synchronisation signal of the second type is received; and detecting, by the UE, the synchronisation signal of the second type in the determined $M_2$ symbols $k_j$ of the subframe, wherein the subframe comprises N symbols and at least one of the N symbols has a cyclic prefix length different than the cyclic prefix lengths of other ones of the N symbols, where $N > M_2 > M_1 > 2$, wherein the synchronisation signal of the first type only occupies the $M_1$ symbols $l_i$ within the subframe, wherein the synchronisation signal of the second type only occupies the $M_2$ symbols $k_j$ within the subframe, wherein the $M_1$ symbols $l_i$ have equal cyclic prefix lengths, and the $M_2$ symbols $k_j$ have equal cyclic prefix lengths, and wherein an amplifier of the transmitter is switched off after transmission of symbols holding synchronisation signals of the first and second types when the synchronisation signals of the first and second type are contiguous.

14. The method according to claim 10, wherein the $M_1$ symbols $l_i$ are determined to be contiguously located in subsequent symbols $l_i$, such that:

$l_{i+1} = l_i + 1$.

15. The method according to claim 13, wherein the $M_1$ symbols $l_i$ are determined to be contiguously located in subsequent symbols $l_i$, such that: $l_{i+1} = l_i + 1$.

* * * * *

UNITED STATES PATENT AND TRADEMARK OFFICE
CERTIFICATE OF CORRECTION

PATENT NO. : 11,259,259 B2
APPLICATION NO. : 15/250543
DATED : February 22, 2022
INVENTOR(S) : Berggren It is certified that error appears in the above-identified patent and that said Letters Patent is hereby corrected as shown below:

On the Title Page

Item (56) U.S. Patent Documents: "2004/0114551 A1 6/2004 Gavillero et al." should read
-- 2004/0114551 A1 6/2004 Gavillero Martin et al. --.

Page 2: Item (56) Other Publications, Column 2, Lines 18-19: "Schmidl et al., "Robust Frequency and Timing Synchronization," IEEE Transactions on Communications, vol. 24, Issue 12, pp." should read -- Schmidl et al., "Robust Frequency and Timing Synchronization for OFDM," IEEE Transactions on Communications, vol. 45, Issue 12, pp. --.

In the Claims

Claim 5: Column 27, Line 55: "$l_{i+1} \leq l_i + N - 3$." should read -- $l_{i+1} \geq l_i + N - 3$. --.

Claim 10: Column 28, Line 34: "$N > M_2 > M_1 > 2$ and at least one of the $N$ symbols has" should read -- $N > M_2 \geq M_1 \geq 2$ and at least one of the $N$ symbols has --.

Claim 11: Column 28, Line 49: "A wireless communication network including user" should read -- A wireless communication network including a user --.

Claim 11: Column 28, Line 58: "$N$ symbols, wherein $N > M_2 > M_1 > 2$, the UE comprising:" should read -- $N$ symbols, wherein $N > M_2 \geq M_1 \geq 2$, the UE comprising: --.

Claim 12: Column 29, Line 25: "$k_j = l_i + \Delta_j$, $\forall l_i$, where $|\Delta_j| > 0$, $(k_j, l_i) \in \{0, 1, ..., N-1\}$." should read -- $k_j = l_i + \Delta_j$, $\forall l_i$, where $|\Delta| > 0$, $(k_j, l_i) \in \{0, 1, ..., N-1\}$. --.

Claim 13: Column 30, Line 17: "of the N symbols, wherein $N > M_2 > M_1 > 2$," should read -- of the $N$ symbols, wherein $N > M_2 \geq M_1 \geq 2$, --.

Signed and Sealed this
Nineteenth Day of July, 2022

Katherine Kelly Vidal
*Director of the United States Patent and Trademark Office*